United States Patent
Takaku et al.

(10) Patent No.: US 8,651,651 B2
(45) Date of Patent: Feb. 18, 2014

(54) INK JET INK AND INK JET RECORDING METHOD

(75) Inventors: Yusuke Takaku, Tokyo (JP); Hisashi Mori, Tokyo (JP)

(73) Assignee: Konica Minolta IJ Technologies, Inc. (JP)

( * ) Notice: Subject to any disclaimer, the term of this patent is extended or adjusted under 35 U.S.C. 154(b) by 0 days.

(21) Appl. No.: 13/446,276

(22) Filed: Apr. 13, 2012

(65) Prior Publication Data

US 2012/0262517 A1    Oct. 18, 2012

(30) Foreign Application Priority Data

Apr. 15, 2011    (JP) ................. 2011-090693

(51) Int. Cl.
    *C09D 11/00*    (2006.01)
(52) U.S. Cl.
    USPC ........................................... 347/100
(58) Field of Classification Search
    USPC ........................................... 347/100
    See application file for complete search history.

(56) References Cited

U.S. PATENT DOCUMENTS

2003/0196569 A1*   10/2003   Yatake et al. ............... 106/31.58
2004/0189775 A1*    9/2004   Lee et al. ...................... 347/102

FOREIGN PATENT DOCUMENTS

| JP | 06-088048 A | 3/1994 |
|---|---|---|
| JP | 2008-155524 A | 7/2008 |
| JP | 2009-226764 A | 10/2009 |
| JP | 2009-262334 A | 11/2009 |
| JP | 2010-89370 A | 4/2010 |
| JP | 2010-168433 A | 8/2010 |
| JP | 2010-248357 A | 11/2010 |
| JP | 2011-068838 A | 4/2011 |

OTHER PUBLICATIONS

Japanese Notice of Reasons for Rejection for Japanese Patent Application No. 2011-090693; Date of Drafting: Aug. 14, 2013, with English Translation.

* cited by examiner

*Primary Examiner* — Laura Martin
(74) *Attorney, Agent, or Firm* — Cantor Colburn LLP

(57) ABSTRACT

In an ink jet ink containing a pigment, a binder resin, water, an organic solvent, and a surfactant, the surface tension of the ink is in a region defined by $\gamma_0 - \gamma_x \geq 1.0$ ($\gamma_0$: surface tension before evaporation, $\gamma_x$: surface tension at an evaporation rate X %) when the evaporation rate X of the ink is in a range of $0 < X(\%) \leq 20$; the ink jet ink contains two or more organic solvents; and the content of an organic solvent of which the sum ΣSP of the hydrogen bonding term and the polarity term of the solubility parameter is 8 to 18 $MPa^{1/2}$ is 30 mass % or more and less than 95 mass % of the total amount of the organic solvents; and the content of the surfactant is less than the critical micelle concentration of the surfactant.

8 Claims, 6 Drawing Sheets

INK JET INK AND INK JET RECORDING METHOD

TECHNICAL FIELD

The present invention relates to an aqueous ink jet ink that can record information on a recording medium having poor ink absorbability and relates to an ink jet recording method using the ink.

BACKGROUND ART

Ink jet inks for industrial use have been extensively developed so that the inks can be used in direct printing on recording media that hardly absorb inks, e.g., recording media having poor water absorbability such as resin- or clay-coated paper, recording media coated with resin components, or resin films themselves, as well as on paper and cloth having ink absorbability.

Examples of ink jet inks satisfying such requirements include solvent ink jet inks containing organic solvents as vehicles and ultraviolet curable ink jet inks containing photopolymerizable monomers as their main components. In the solvent ink jet inks, the solvents are evaporated, and most of the solvent components dissipate in the air. This causes generation of a large amount of volatile organic compounds (VOC), which is nowadays a socially disputed issue. In addition, odors and adverse safety effects on workers are concerned, and facilities, such as sufficient ventilation systems, for overcoming such concerns are required in use of the ink. In contrast, ultraviolet curable ink jet inks can be cured immediately after printing and thus are substantially free of VOC. Some of the ultraviolet curable ink jet inks, however, have skin sensitization potential due to monomers contained therein. In addition, ink jet printers are required to be equipped with expensive ultraviolet light sources. Accordingly, fields to which the ultraviolet curable ink jet inks can be applied are inevitably limited. Furthermore, upon printing on glossy sheets, the glossiness is considerably lost at areas where the inks are applied, which makes it difficult to yield an image having high quality.

In consideration of these circumstances, approaches using aqueous ink jet inks have been extensively developed for printing on recording media having poor absorbability, as well as on recording media having ink absorbability, such as cloth and paper. The aqueous ink jet inks (hereinafter, referred to as aqueous inks or simply inks), primarily composed of water, have a low environmental load and have been widely used at home. Unfortunately, recording media having poor absorbability, such as coated paper and resin films, have low surface energy in many cases and do not absorb typical aqueous inks. Consequently, ink droplets landed on such a recording medium are repelled to generate pin hole in an image or unevenness in a solid portion, resulting in a decrease in image quality. Another disadvantage is that the recording medium has no aqueus ink absorbency; this prolongs drying time and causes deposition of unabsorbed coloring materials on the recording medium, resulting in a decrease in image durability such as friction resistance.

A method of preventing repelling of an aqueous ink by adding a surfactant or an aqueous organic solvent having a low surface tension to the ink improves wettability of the aqueous ink to a nonabsorbent medium and thereby prevents occurrence of repelling to some extent. However, addition of an excess amount of a surfactant causes precipitation of the surfactant after the ink dries, resulting in a decrease in image glossiness. Since the surfactant is localized at the interface between the recording medium and ink, the formed image layer does not stick to the recording medium, in spite of prevented repelling. As a result, adhesion of the formed image to the recording medium decreases to cause a reduction in image durability. Although the use of an organic solvent having low surface tension does not cause precipitation, it does not increase the friction resistance. In addition, many of the organic solvents having low surface tensions have high boiling points, causing poor ink drying characteristics.

A measure for solving these disadvantages involves the addition of a solvent can be absorbed into a polyvinyl chloride sheet to improve friction resistance (e.g., see PTL 1). In particular, PTL 1 claims that an ink containing a β-alkoxypropionamide exhibits excellent glossiness and friction resistance and is also effective for resolving the ink repelling issue. Unfortunately, the results of investigation by the present inventors show that although the method described in PTL 1 prevents weak repelling to some extent, effects on preventing strong repelling and pin holes are still low. Consequently, the method described in PTL 1 is still insufficient for preventing formation of defected images (e.g., unevenness or pin holes).

Another disclosed approach to improve image quality is to adjust the solubility parameter of a solvent in an aqueous ink to approximately the solubility parameter of a plasticizer, such as polyvinyl chloride, contained in a nonabsorbent base material (e.g., see PTL 2). Unfortunately, the results of investigation by the present inventors show that although a certain improvement is observed in a region to which a small amount of ink droplets is applied, repelling and pin holes occur in a region, such as solid printing, where a large amount of ink droplets is applied and that the resulting image has a large difference in glossiness between the white surface portion of the base material and the image portion to give discomfort feeling in visual observation.

Methods are also disclosed that involve addition of surfactants to aqueous inks to decrease repellency of the aqueous inks on nonabsorbent base materials (e.g., see PTLs 3 to 6). Unfortunately, the results of investigation by the present inventors show that the wettability of an aqueous ink to a nonabsorbent recording medium is improved by the addition of a surfactant, but an improvement in image quality, in particular, unevenness and pin holes in solid portions, is still insufficient. On the contrary, the addition of a surfactant further decreases image quality in some cases.

Thus, in the case of recording on a nonabsorbent recording medium, in particular, on a vinyl chloride sheet, with an aqueous ink, it is significantly difficult to form an image having high fineness comparable to that of an image formed with a solvent ink.

CITATION LIST

Patent Literature

PTL 1: Japanese Patent Application Laid-Open No. 2010-168433

PTL 2: Japanese Patent Application Laid-Open No. 2010-248357

PTL 3: Japanese Patent Application Laid-Open No. 2010-89370

PTL 4: Japanese Patent Application Laid-Open No. 2009-226764

PTL 5: Japanese Patent Application Laid-Open No. 2008-155524

PTL 6: Japanese Patent Application Laid-Open No. 2009-262334

SUMMARY OF INVENTION

Technical Problem

The present invention has been achieved in view of the above-described problems. It is an object of the present invention to provide an aqueous ink jet ink that exhibits low environmental load during image formation and can form a print image having high fineness without uneven density or pin holes, excellent glossiness and high friction resistance on a nonabsorbent recording medium. It is also an object of the present invention to provide an ink jet recording method using the ink.

Solution to Problem

The objects of the present invention can be achieved by the following aspects:

1. An ink jet ink including a pigment, a binder resin, water, an organic solvent, and a surfactant, wherein the ink jet ink satisfies the following requirements (a), (b), and (c):

Requirement (a): the ink jet ink has a surface tension in a region defined by Expression (2) when an evaporation rate X defined by Expression (1) is in the range of 0<X(%)<20, Evaporation rate $X(\%) = \{[(\text{initial mass of ink jet ink}) - (\text{mass of ink jet ink after evaporation})]/(\text{initial mass of ink jet ink})\} \times 100$      Expression (1)

$\gamma_0 - \gamma_x \geq 1.0$ (mN/m)      Expression (2)

(wherein, $\gamma_0$ represents the surface tension (mN/m) of the ink jet ink before evaporation; and $\gamma_x$ represents the surface tension (mN/m) of the ink jet ink at an evaporation rate X % and $0 < X(\%) \leq 20$), Requirement (b): the ink jet ink contains two or more organic solvents; and a content of an organic solvent of which the sum ΣSP of the hydrogen bonding term and the polarity term of the solubility parameter is 8 MPa$^{1/2}$ to 18 MPa$^{1/2}$ is 30 mass % to 95 mass % of a total amount of the organic solvents in the ink jet ink, and Requirement (c): the content of at least one surfactant is less than the critical micelle concentration of the surfactant.

2. The ink jet ink according to aspect 1, wherein the sum ΣSP of the hydrogen bonding term and the polarity term of the solubility parameter defined in requirement (b) of the organic solvent is 8 MPa$^{1/2}$ to 15 MPa$^{1/2}$.

3. The ink jet ink according to aspect 1 or 2, wherein the total content of the organic solvents is 5.0 mass % to 40 mass % of the total mass of the ink jet ink.

4. The ink jet ink according to any one of aspects 1 to 3, wherein a solubility of polyvinyl chloride in at least one of the organic solvents is 1.0 mass % or more.

5. The ink jet ink according to any one of aspects 1 to 4, further including a β-alkoxypropionamide.

6. An ink jet recording method including ejecting the ink jet ink according to any one of aspects 1 to 5 on a recording medium to form thereon an image.

7. The ink jet recording method according to aspect 6, further including drying by heating the ink.

8. The ink jet recording method according to aspect 6 or 7, wherein the recording medium is a nonabsorbent recording medium.

Advantageous Effects of Invention

The present invention provides an aqueous ink jet ink that exhibits low environmental load during image formation and can form a print image having high fineness without uneven density or pin holes, excellent glossiness and high friction resistance on a nonabsorbent recording medium. The present invention also provides an ink jet recording method using the ink.

DESCRIPTION OF EMBODIMENTS

Embodiments of the present invention will now be described in detail.

The present inventors, who have diligently studied in view of the above-mentioned problems, have found the following facts: An ink jet ink containing a pigment, a binder resin, water, an organic solvent, and one or more surfactants exhibits low environmental load during image formation and can form a print image having high fineness without uneven density or pin holes excellent glossiness and high friction resistance on a nonabsorbent recording medium, provided that the ink satisfies the following requirements (a), (b), and (c):

Requirement (a): the ink jet ink has a surface tension in a region defined by Expression (2) at an evaporation rate X defined by Expression (1) in the range of 0<X(%) δ 20, Requirement (b): the ink jet ink contains two or more organic solvents; and the content of an organic solvent of which the sum ΣSP of the hydrogen bonding term and the polarity term of the solubility parameter is 8 MPa$^{1/2}$ or more and 18 MPa$^{1/2}$ or less is 30 mass % or more and less than 95 mass % of the total amount of the organic solvents in the ink jet ink; and Requirement (c): the content of at least one of the surfactants is less than the critical micelle concentration of the surfactant. Thus, the present invention has been accomplished.

The ink jet ink of the present invention can exhibit the above-mentioned advantageous effects probably by the following reasons.

Figure 1:
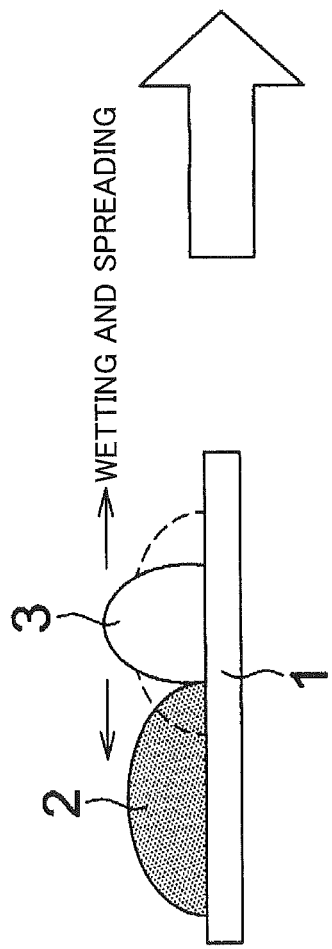
FIG. 1 is a schematic diagram illustrating a typical conventional pattern of forming an image by landing of a second ink droplet on a nonabsorbent recording medium after discharge of a first ink droplet.

FIG. 1 illustrates conditions causing uneven density or pin holes in an image formed on a recording medium, in particular, on a nonabsorbent recording medium (e.g., a polyvinyl chloride sheet) with a common aqueous ink. FIG. 1 is a schematic view illustrating a typical conventional pattern of forming an image by landing of a second ink droplet 3 on a nonabsorbent recording medium 1 after discharge of a first ink droplet 2.

As shown in FIG. 1, the second ink droplet 3 lands on the nonabsorbent recording medium 1 at a position adjacent to the first ink droplet 2 that has not sufficiently dried. This probably causes uneven density or pin holeswhitening defects.

In order to accelerate drying of ink droplets without decreasing the printing rate, the evaporation rate of an aqueous ink is increased by enlarging the dot diameter of an aqueous ink droplet by increasing wettability of the aqueous ink to a nonabsorbent recording medium, or an organic solvent that can be absorbed into a nonabsorbent recording medium is added to an ink (Japanese Patent Laid-Open No. 2010-168433). Examples of the method for increasing the wettability of an aqueous ink to a nonabsorbent recording medium include an approach involving adjusting the solubility parameter of a solvent in an ink to approximately the solubility parameter of a nonabsorbent recording medium (Japanese Patent Application Laid-Open No. 2010-248357) and approaches involving decreasing the surface tension of an aqueous ink by adding a surfactant to the ink (e.g., Japanese Patent Application Laid-Open Nos. 2010-89370, 2009-226764, 2008-155524, and 2009-262334).

The present inventors have investigated image formation on nonabsorbent recording media based on these approaches, but no approach sufficiently prevented uneven density or pin holes in images formed on nonabsorbent recording media.

Figure 2:
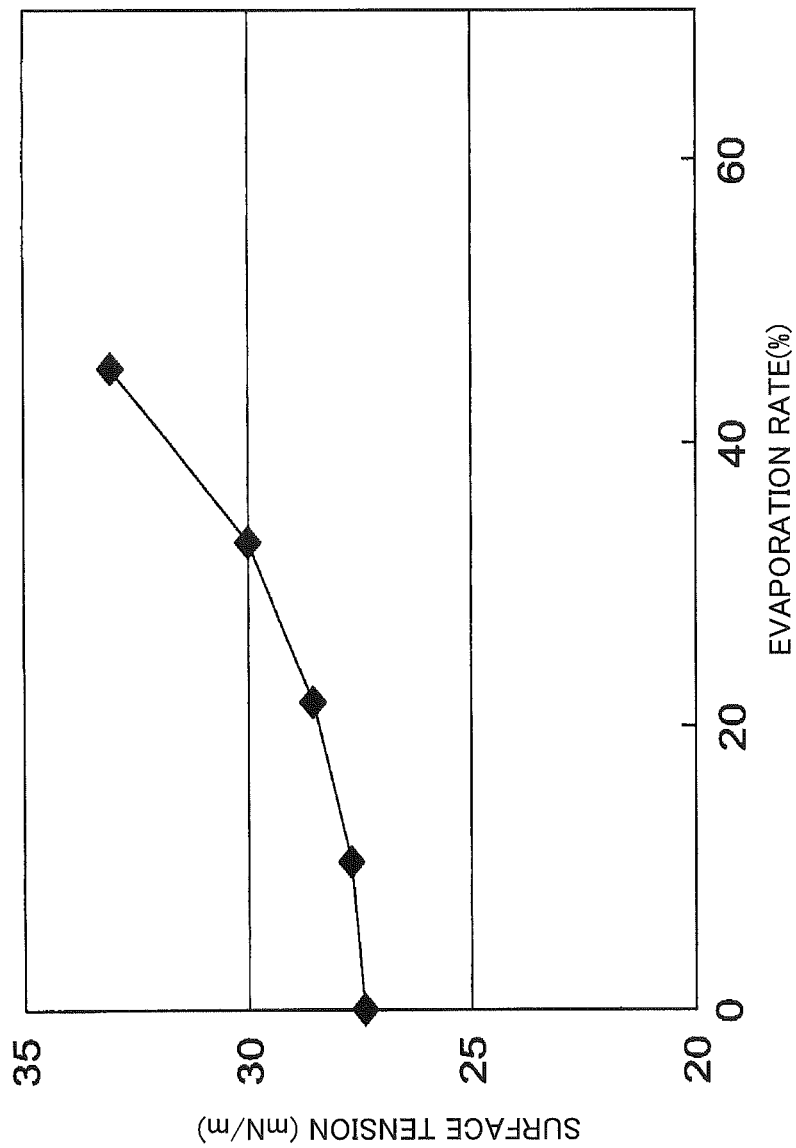
FIG. 2 is a graph showing a behavior of a conventional ink, where the surface tension of an ink droplet increases with increasing evaporation rate.

The present inventors have investigated the aqueous inks used in these approaches that did not sufficiently prevent uneven density or pin holes, and have discovered, as shown in FIG. 2, that the surface tension of an ink droplet landed on a nonabsorbent recording medium gradually increases with evaporation of the solvent in a drying process.

Figure 3:
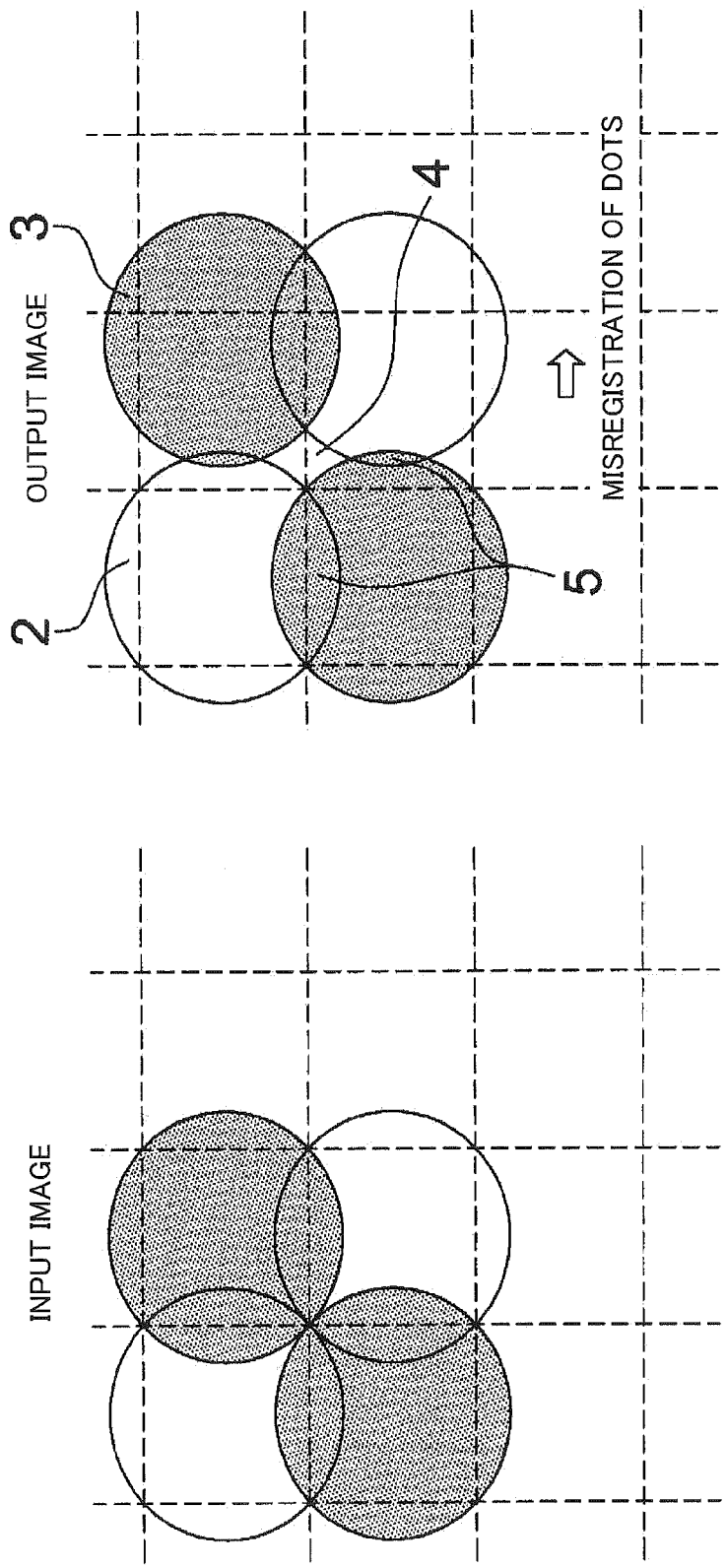
FIG. 3 is a schematic diagram for explaining a mechanism of occurrence of pin holes due to misregistration of ink droplets of a conventional ink.

The inventors deduced from such a behavior of ink droplets that uneven density and pin holes occur by the following mechanism: Evaporation of a first ink droplet 2 landed on a nonabsorbent recording medium 1 progresses within a time from the landing thereof to the landing of a second ink droplet 3. The surface tension of the ink droplet increases with the evaporation, as shown in FIG. 2. Consequently, the surface tension of the second ink droplet 3 landed adjacent to the first ink droplet 2 is relatively lower than that of the first ink droplet 2, causing a difference in surface tension between the adjacent two ink droplets. This prevents the second ink droplet 3 immediately after landing from staying at the target position, and the second ink droplet 3 is attracted toward the first ink droplet 2, as shown in FIG. 1. This phenomenon causes uneven density due to nonuniformity in amount of ink droplets, and, as shown in FIG. 3, displacement of a plurality of ink droplets 2 and 3 from predetermined positions forms a region where a portion of an image is not formed. Thus, a pin holes 4 occurs. In contrast, uneven density 5 is caused by an increase in the number of portions where a plurality of ink droplets overlap with each other.

Figure 4:
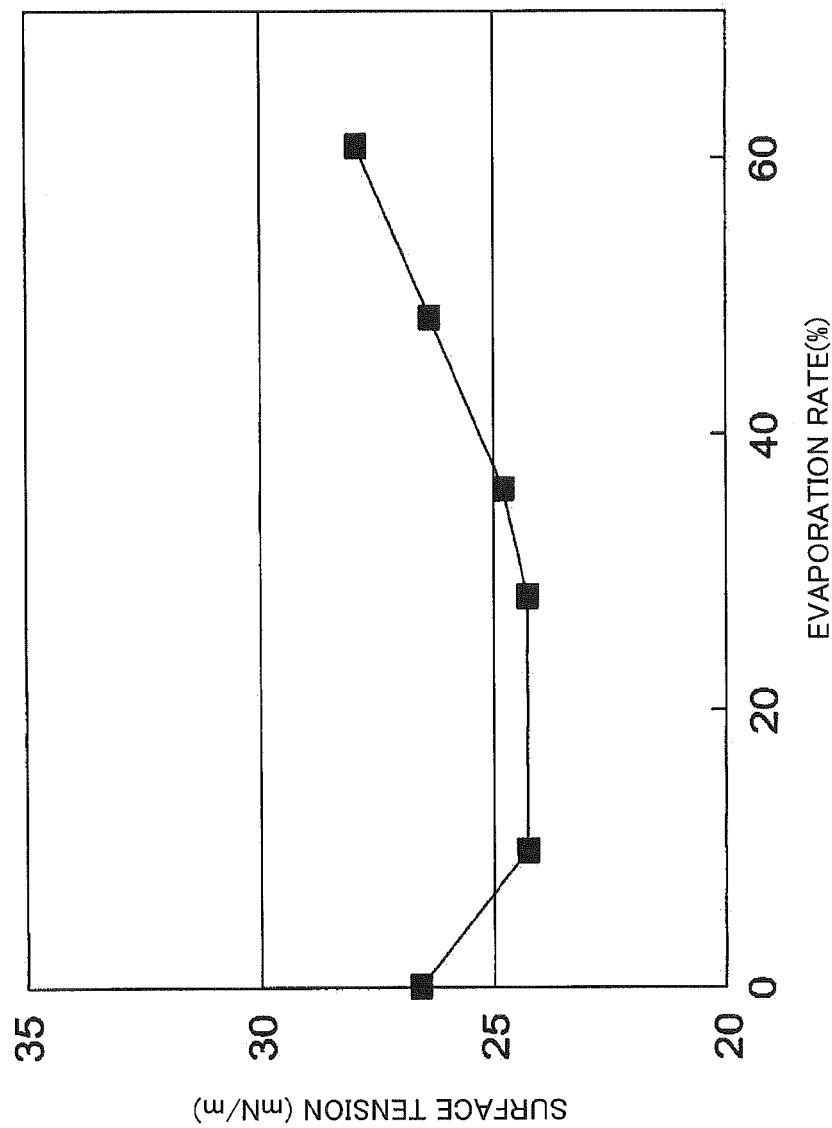
FIG. 4 is a graph showing an ink in accordance with an embodiment of the present invention having characteristics where the surface tension of an ink droplet decreases with an increase in evaporation rate.

It is deduced that the phenomenon that the surface tension of an ink droplet increases with evaporation occurs by the following mechanism. In an aqueous ink jet ink containing a solvent mixture of water and an organic solvent having a higher boiling point than water, water evaporates relatively faster than the organic solvent to gradually increase the proportion of the organic solvent in the ink droplet. Consequently, a part of surfactant at the surface of an ink droplet is dissolved into the organic solvent and is incorporated inside the ink droplet. As a result, the surface tension of the ink droplet itself probably increases. In contrast, if an ink is provided with a characteristic that the surface tension decreases with increasing evaporation rate as shown in FIG. 4, the second ink droplet 3A is prevented from being attracted to the first ink droplet 2A (see FIG. 5), and thereby uneven density and pin holes can be inhibited.

In the ink of the present invention, the concentration of at least one of the surfactants contained in the ink is less than the critical micelle concentration. Accordingly, the density of the surfactant in the ink increases with concentration of the ink due to evaporation, and thereby the amount of the surfactant at the ink droplet surface increases, reducing the surface tension of the ink.

Figure 6:
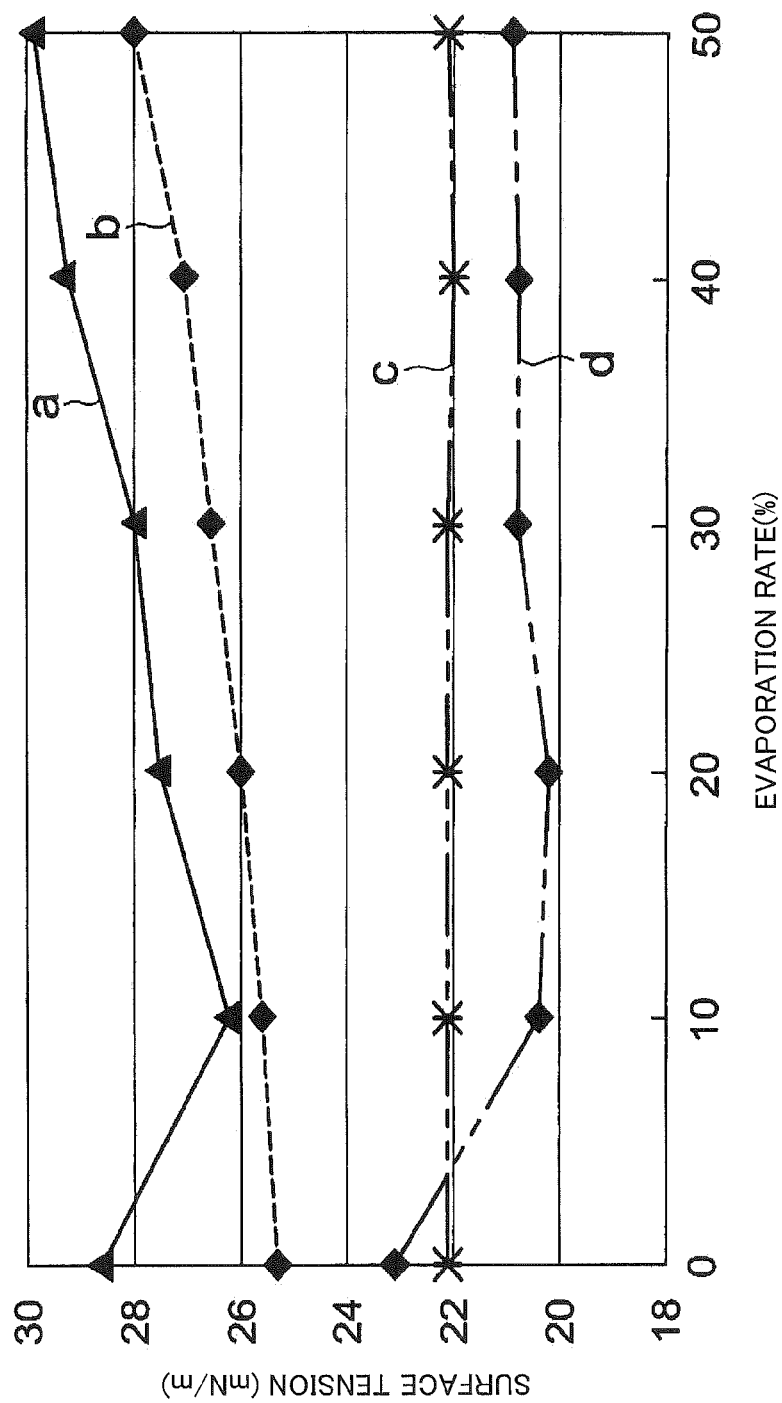
FIG. 6 is a graph showing typical patterns of changes in surface tension of inks, associated with increases in evaporation rate of the inks.

FIG. 6 shows typical patterns of variable surface tension of inks, associated with increases in evaporation rate of the inks.

As shown in FIG. 6, patterns of changes in surface tension of inks, associated with increases in evaporation rate of the inks, are roughly classified into four types.

In the patterns shown in FIG. 6, type 1 (indicated by "a") and type 4 (indicated by "d") are inks in accordance with the present invention. That is, if the evaporation rate X of the ink defined in the present invention is in the range of $0<X(\%) \leq 20$, the surface tension of the ink is in a region satisfying a requirement defined by $\gamma_0 - \gamma_x \geq 1.0$ (mN/m) (wherein, $\gamma_0$ represents the surface tension (mN/m) of the ink before evaporation; $\gamma_x$ represents the surface tension (mN/m) of the ink at an evaporation rate X %). Specifically, in the ink of type 1 (a) of the present invention, the evaporation rate X of the ink decreases by about 2.5 mN/m with the evaporation rate in the range of 10% or less, and then the surface tension continuously increases with the evaporation rate in the range of higher than 10%. In the ink of type 4 (d), the evaporation rate X of the ink decreases by about 2.0 mN/m with the evaporation rate in the range of 20% or less, and then the surface tension levels off or gradually increases with the evaporation rate in the range of higher than 20%. In the present invention, such characteristics shown as type 1 (a) or type 4 (d) can be imparted to an ink by adjusting the content of at least one of the surfactants in the ink to be less than the critical micelle concentration of the surfactant.

Unlike the inks of types 1 (a) and 4 (d) of the present invention, type 2 (indicated by "b") and type 3 (indicated by "c") in FIG. 6 do not satisfy the requirements defined by Expression (2). That is, these inks do not exhibit a decrease in surface tension of 1.0 mN/m or more after evaporation of the solvents. In the ink of type 2 (b), the surface tension increases at a constant slope with evaporation of the solvent and does not decrease over the entire evaporation rate range. In the ink of type 3 (c), the surface tension does not substantially change regardless of evaporation of the ink.

In addition, the ink of the present invention contains a certain amount of an organic solvent of which the sum ΣSP of the hydrogen bonding term and the polarity term of the solubility parameter is 8 MPa$^{1/2}$ or more and 18 MPa$^{1/2}$ or less. This increases the wettability of the ink to nonabsorbent recording media, in particular, a base material having a low surface energy, such as polyvinyl chloride, to accelerate drying after landing and enlarge the dot diameter. Since the organic solvent has a high boiling point and a low surface tension, the ink is concentrated by evaporation of volatile components to increase the rate of the organic solvent. This probably further decreases the surface tension of the ink.

The aqueous ink jet ink of the present invention will now be described in detail.

Ink Jet Ink

The aqueous ink jet ink of the present invention (hereinafter, referred to as aqueous ink of the present invention or ink of the present invention) contains at least a pigment, a binder resin, water, an organic solvent, and a surfactant and satisfies the following requirements (a), (b), and (c):

Requirement (a): the ink jet ink has a surface tension in a region defined by Expression (2) at an evaporation rate X defined by Expression (1) in the range of 0<X(%)≤20, Evaporation rate $X(\%)=\{[(\text{initial mass of ink jet ink})-(\text{mass of ink jet ink after evaporation})]/(\text{initial mass of ink jet ink})\}\times 100$     Expression (1)

$\gamma_0-\gamma_x\geq 1.0$ (mN/m)     Expression (2):

(wherein, $\gamma_0$ represents the surface tension (mN/m) of the ink jet ink before evaporation; and $\gamma_x$ represents the surface tension (mN/m) of the ink jet ink at an evaporation rate X % and 0<X(%)≤20);

Requirement (b): the ink jet ink contains two or more organic solvents; and the content of an organic solvent of which the sum ΣSP of the hydrogen bonding term and the polarity term of the solubility parameter is 8 MPa$^{1/2}$ or more and 18 MPa$^{1/2}$ or less is 30 mass % or more and less than 95 mass % of the total amount of the organic solvents in the ink jet ink; and Requirement (c): the content of at least one of the surfactants is less than the critical micelle concentration of the surfactant.

The ink of the present invention satisfying such requirements not only can form a print image having high fineness and excellent image durability, which are comparable to those of images formed with solvent ink jet inks, on nonabsorbent recording media represented by polyvinyl chloride sheets, polyethylene terephthalate sheets, or coated paper but also can form a print image having high fineness on recording media having ink absorbability, such as paper and cloth.

Organic Solvent

The ink of the present invention contains at least two organic solvents, and the content of an organic solvent of which the sum ΣSP of the hydrogen bonding term and the polarity term of the solubility parameter is 8 MPa$^{1/2}$ or more and 18 MPa$^{1/2}$ or less is 30 mass % or more and less than 95 mass % of the total amount of the organic solvents in the ink.

The solubility parameter (SP) is a value usually used as a measure of solubility and is deduced from the cohesive energy of a molecule. In the Hansen parameters, i.e., a dispersion term, a polarity term, and a hydrogen bonding term, which are contribution terms of the solubility parameter, the hydrogen bonding term (σh) and the polarity term (σp) are expressed in the unit of (MPa)$^{1/2}$. For example, Polymer HandBook (Second Edition), Chapter IV, Solubility Parameter Value describes the Hansen parameters in detail. The hydrogen bonding term (σh) and the polarity term (σp) of organic solvents used in the present invention are calculated using the energy contribution term against each atomic group described in Table 4 of Polymer HandBook (Second Edition), Chapter VII, p. 686.

The present inventors particularly focused on the hydrogen bonding term and the polarity term among the characteristic values of the solubility parameter of an organic solvent. The inventors deduced that one possible reason for this is that wettability of an ink to a nonabsorbent recording medium increases with decreasing difference between the sum of the hydrogen bonding term and the polarity term of the surface free energy of a nonabsorbent recording medium and the sum of the hydrogen bonding term and the polarity term of the solubility parameter of an organic solvent in the ink. Another possible reason is that such a small difference accelerates drying of an aqueous ink droplet after landing on a nonabsorbent recording medium. As described in Japanese Application Patent Laid-Open No. 2008-260820, in an aqueous ink containing a binder resin, a hydrophobic organic solvent rapidly increases the viscosity of an ink droplet after landing to inhibit mixing of adjacent ink droplets to prevent uneven density and pin holes.

An ink of the present invention containing an organic solvent, in addition to the organic solvent satisfying the requirement that the sum ΣSP of the hydrogen bonding term and the polarity term of the solubility parameter is 8 MPa$^{1/2}$ or more and 18 MPa$^{1/2}$ or less, can form a high quality image. Its reason is unclear, but it is deduced as follows: An organic solvent of which the sum ΣSP of the hydrogen bonding term and the polarity term of the solubility parameter is 8 MPa$^{1/2}$ or more and 18 MPa$^{1/2}$ or less generally has high hydrophobicity. If such an organic solvent is used alone in an aqueous ink of which main component is water, the polarity of the whole ink highly varies associated with evaporation of the ink, resulting in unstable dispersion of the pigment. As a result, nonuniform aggregation or sedimentation occurs in ink droplets after landing to cause defects such as uneven density and a decrease in glossiness. Accordingly, from the viewpoint of yielding a high quality image, the content of the organic solvent of which the sum ΣSP of the hydrogen bonding term and the polarity term of the solubility parameter is 8 MPa$^{1/2}$ or more and 18 MPa$^{1/2}$ or less is 30 mass % or more and less than 95 mass % of the total amount of the organic solvents in the ink.

Table 1 shows the hydrogen bonding terms (σh), the polarity terms (σp), and the sums ΣSP thereof of typical known organic solvents.

TABLE 1

| | Solubility parameter | | |
|---|---|---|---|
| Name of organic solvent | σp (MPa$^{1/2}$) | σp (MPa$^{1/2}$) | ΣSP (MPa$^{1/2}$) |
| Dipropylene glycol dimethyl ether | 3.1 | 5.8 | 8.9 |
| Diethylene glycol diethyl ether | 3.2 | 5.8 | 9.0 |
| Tetraethylene glycol dimethyl ether | 4.1 | 8.3 | 12.4 |
| 3-Butoxy-N,N-dimethylpropionamide | 6.4 | 7.4 | 13.8 |
| Dipropylene glycol monopropyl ether | 3.3 | 11.0 | 14.3 |
| Dipropylene glycol monoethyl ether | 3.7 | 11.5 | 15.2 |
| 1-Octanol | 3.3 | 11.9 | 15.2 |
| Ethylene glycol monoethyl ether acetate | 4.7 | 10.6 | 15.3 |
| Triethylene glycol monobutyl ether | 4.1 | 11.8 | 15.9 |
| Dipropylene glycol monomethyl ether | 4.1 | 12.1 | 16.2 |
| Diethylene glycol monobutyl ether | 4.4 | 12.3 | 16.7 |
| Propylene glycol monobutyl ether | 4.6 | 12.8 | 17.3 |
| 3-Methoxy-N,N-dimethylpropionamide | 8.9 | 8.7 | 17.6 |
| Propylene glycol monopropyl ether | 4.8 | 13.1 | 17.9 |
| 2-Pyrrolidone | 10.4 | 8.2 | 18.6 |
| Diethylene glycol monoethyl ether | 5.5 | 13.8 | 19.3 |
| γ-Butyrolactone | 11.3 | 8.1 | 19.4 |
| Propylene glycol monoethyl ether | 5.5 | 14.1 | 19.6 |
| N-Methylpyrrolidone | 11.5 | 8.5 | 20.0 |
| Diethylene glycol monomethyl ether | 9.2 | 12.3 | 21.5 |
| 1-Propanol | 6.7 | 16.4 | 23.1 |
| 1,3-Dimethyl-2-imidazolidine | 12.6 | 10.5 | 23.1 |
| 1,2-Hexanediol | 5.7 | 17.9 | 23.6 |
| Dipropylene glycol | 6.2 | 18.1 | 24.3 |
| 1,2-Pentanediol | 6.6 | 19.3 | 25.9 |
| Triethylene glycol | 12.5 | 18.6 | 31.1 |
| Propylene glycol | 9.6 | 23.4 | 33.0 |

The ink of the present invention contains at least two organic solvents, and the content of the organic solvent of which the sum ΣSP of the hydrogen bonding term and the polarity term of the solubility parameter is 8 MPa$^{1/2}$ or more and 18 MPa$^{1/2}$ or less is 30 mass % or more and less than 95 mass % of the total amount of the organic solvents in the ink. The sum of the hydrogen bonding term and the polarity term of the solubility parameter of the organic solvent is more preferably 8 MPa$^{1/2}$ or more and 15 MPa$^{1/2}$ or less. The total amount of the organic solvents contained in the ink is more preferably 5 mass % or more and 40 mass % or less. As a result, the wettability of the ink to nonabsorbent recording media, in particular, a base material having a low surface energy, such as polyvinyl chloride, increases to accelerate drying of the ink after landing.

Examples of the organic solvent of which the sum ΣSP of the hydrogen bonding term and the polarity term of the solubility parameter is 8 MPa$^{1/2}$ or more and 18 MPa$^{1/2}$ or less include propylene glycol monopropyl ether, 3-butoxyl-N,N-dimethylpropionamide, propylene glycol monobutyl ether, diethylene glycol monobutyl ether, dipropylene glycol monomethyl ether, triethylene glycol monobutyl ether, ethylene glycol diacetate, ethylene glycol monoethyl ether acetate, dipropylene glycol monoethyl ether, 1-octanol, dipropylene glycol monopropyl ether, 3-methoxy-N,N-dimethylpropionamide, tetraethylene glycol dimethyl ether, cyclohexanone, diethylene glycol diethyl ether, dipropylene glycol dimethyl ether, tripropylene glycol monomethyl ether, and tripropylene glycol dimethyl ether.

Among them, dipropylene glycol monomethyl ether (ΣSP=16.2 MPa$^{1/2}$), dipropylene glycol monopropyl ether (ΣSP=14.3 MPa$^{1/2}$), 3-butoxy-N,N-dimethylpropionamide (ΣSP=13.8 MPa$^{1/2}$), and 3-methoxy-N,N-dimethylpropionamide (ΣSP=17.6 MPa$^{1/2}$) are preferred from the viewpoint of solubility in surfactants. In particular, 3-butoxyl-N,N-dimethylpropionamide is more preferred from the viewpoint of absorbency into a polyvinyl chloride sheet.

The ink of the present invention contains at least two organic solvents. The ink can further contain another organic solvent, provided that the content of an organic solvent of which the sum ΣSP of the hydrogen bonding term and the polarity term of the solubility parameter is 8 MPa$^{1/2}$ or more and 18 MPa$^{1/2}$ or less is 30 mass % or more and less than 95 mass % of the total amount of the organic solvents in the ink.

Examples of the optional organic solvent include ethylene glycol monoalkyl ethers, diethylene glycol monoalkyl ethers, triethylene glycol monoalkyl ethers, propylene glycol monoalkyl ethers, dipropylene glycol monoalkyl ethers, tripropylene glycol monoalkyl ethers, alcohols (e.g., methanol, ethanol, propanol, isopropanol, butanol, isobutanol, sec-butanol, tert-butanol, pentanol, hexanol, cyclohexanol, and benzyl alcohol), polyols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, 1,3-propanediol, 1,4-butanediol, 1,5-pentanediol, 1,2-pentanediol, 1,2-hexanediol, and 1,2,6-hexanetriol), amines (e.g., ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine), amides (e.g., formamide, N,N-dimethylformamide, N,N-dimethylacetamide, and β-alkoxypropionamide), heterocyclics (e.g., 2-pyrrolidone, N-methyl-2-pyrrolidone, cyclohexylpyrrolidone, and 2-oxazolidone), sulfoxides (e.g., dimethyl sulfoxide), sulfones (e.g., sulfolane), urea, acetonitrile, and acetone.

Among them, water-soluble organic solvents such as glycol ethers and 1,2-alkanediols are preferred. Specifically, a glycol ether or a 1,2-alkanediol is preferably used. Examples of the 1,2-alkanediols include 1,2-butanediol, 1,2-pentanediol, 1,2-hexanediol, and 1,2-heptanediol.

At least one of the organic solvents contained in the ink of the present invention preferably has an ability of dissolving polyvinyl chloride. Specifically, the ink preferably contains an organic solvent, a solubility of polyvinyl chloride in the organic solvent being 1.0 mass % or more, determined in accordance with the following procedure.

An organic solvent having the following properties is defined as an organic solvent having ability of dissolving polyvinyl chloride.

A soft polyvinyl chloride sheet (MD5) manufactured by Metamark Ltd. is cut into a size of about 3 cm×3 cm. The adhesive at the sealing portion is completely removed with ethanol to use a polyvinyl chloride sample. The mass W1 of the sample is measured. The sample is completely immersed in 50 mL of an organic solvent as an evaluation target for 3 minutes. The sample taken out from the organic solvent is washed with pure water and dried. Subsequently, the mass W2 of the sample is measured. The mass change rate after immersion in the organic solvent is calculated by the expression, $\{(W1-W2)/W1 \times 100\}$, and is defined as an ability of dissolving. An organic solvent having the ability of 1.0% or more is defined as an "organic solvent having an ability of dissolving polyvinyl chloride". An organic solvent that completely dissolves the immersed soft polyvinyl chloride sheet to a degree of not maintaining the original form of the sheet obviously has ability of dissolving polyvinyl chloride. An organic solvent having a high solidifying point and thus solidifies at room temperature, for example, sulfolane or 2-pyrrolidone, is evaluated by immersing the soft polyvinyl chloride sheet in the organic solvent warmed to 50° C.

Examples of the organic solvent having the ability of dissolving polyvinyl chloride include 2-pyrrolidone, N-methyl-2-pyrrolidone, cyclohexylpyrrolidone, 2-oxazolidone, sulfolane, and β-alkoxypropionamides. Among these organic solvents, β-alkoxypropionamides are preferred.

The ink of the present invention contains at least two organic solvents. The total content of the organic solvents is preferably in the range of 5 to 40 mass % of the total mass of the ink, from the viewpoints of storage stability and wettability to recording media.

Surfactant

The ink of the present invention contains a surfactant. The surfactant applicable to the ink of the present invention may be any known surfactant. Examples of the surfactant include anionic surfactants such as dialkylsulfosuccinic acid salts, alkylnaphthalenesulfonic acid salts, and fatty acid salts; nonionic surfactants such as polyoxyethylene alkyl ethers, polyoxyethylene alkylallyl ethers, acetylene glycols, and polyoxyethylene-polyoxypropylene block copolymers; cationic surfactants such as alkylamines and quaternary ammonium salts; silicone surfactants; fluorine surfactants; and acetylene diol surfactants. Silicone surfactants and fluorine surfactants are preferred, and polymeric surfactants thereof having an average molecular weight of 1000 or more are more preferred. The surfactant in the present invention may be in either a dissolved state or an emulsified state in the ink.

More specifically, the silicone surfactants are preferably polyether modified polysiloxane compounds. Examples of such compounds include KF-351A, KF-905, and KF-642 manufactured by Shin-Etsu Chemical Co., Ltd.; BYK345, BYK347, BYK348, BYK333, BYK340, and BYK375 manufactured by BYK Chemie GmbH; and TSF4440, TSF4445, and TSF4446 manufactured by Momentive Performance Materials Inc. The fluorine surfactants are those where some or all of hydrogen atoms bonding to the carbon of hydrophobic groups of ordinary surfactants are replaced with fluorine atoms. In particular, fluorine surfactants having perfluoroalkyl groups in their molecules are preferred.

Some of the fluorine surfactants are commercially available under the trade names such as Megafac F (available from DIC Corporation), Surflon (available from Asahi Glass Co., Ltd.), Novec (available from 3M Company), Zonyls (available from E.I. DuPont de Nemours and Company), and Ftergent (available from Neos Co., Ltd.).

The ink contains one or more surfactants, and the content of at least one surfactant is less than the critical micelle concentration of the surfactant.

The critical micelle concentration (CMC) is determined by measuring changes in surface tension of an ink with a surface tension balance while the content (concentration) of the surfactant in the ink is sequentially increased. In plotting of surface tension values versus the concentrations of a surfactant, the surface tension values become approximately constant within a margin of error, at a "certain surface concentration" or more. This "certain surfactant concentration" is defined as the critical micelle concentration.

Although the critical micelle concentration of a surfactant in inks depends on the types and contents of surfactants and organic solvents in the inks and cannot be simply defined for each ink, it can be determined provided that the ink composition is settled and can be in the range of about 0.1 to 0.5 mass % of the total mass of the ink.

The concentration of at least one of the surfactants in an ink is adjusted to less than the critical micelle concentration, so that a region of the evaporation rate X where the surface tension of the ink decreases by 1.0 mN/m or more appears within the range of $0<X(\%)\leq 20$.

In general, the surface tension of an ink decreases as the content of a surfactant decreases. The decrease in surface tension ends at a certain content (critical micelle concentration: CMC) of the surfactant. For example, when the volume of an aqueous solution of a surfactant is reduced to a half by evaporation of water in the aqueous solution, the surfactant concentration doubles. At a surfactant concentration of 0.2% or less on this occasion, the surface tension can be further decreased due to the doubled surfactant concentration. At a surfactant concentration of higher than 0.2%, the effect of decreasing surface tension is already saturated; hence, the reduction in surface tension associated with evaporation of water is low even if the concentration of the surfactant is doubled. On the contrary, the surface tension increases with increasing concentration of the organic solvent.

The present invention is based on the reversal idea of further reducing an amount of a surfactant of an ink, even though a surface tension of the ink is not sufficiently reduced with such amount of the surfactant. The surface tension of an ink decreases by evaporation of the ink solvent, which probably improves image quality. Though the fluorine surfactant can decrease the surface tension of an ink, the effect reaches the peak at a concentration of about 0.2 mass %, or 0.1 mass % in some cases. Consequently, the amount of a fluorine surfactant added to an ink is preferably 0.2 mass % or less, more preferably 0.1 mass % or less.

In general, the dry state of an ink jet ink varies depending on the time, environment, and printing conditions, and the ink composition readily varies near the nozzle. Accordingly, a sufficient amount of a surfactant is usually added to an ink so that the ink properties do not vary even if the ink composition varies (a variation in content of the surfactant). Addition of a sufficient amount of a surfactant to an ink is also preferred from the viewpoint of robustness in the production process. In contrast, if the amount of a surfactant contained in the ink of the present invention is higher than the critical micelle concentration, pin holes or unevenness may occur to impair image quality.

The surface tension of the ink of the present invention is preferably 20 mN/m or more and 35 mN/m or less, more preferably 25 mN/m or more and 30 mN/m or less, for preventing occurrence of uneven density and pin holes even in high speed printing.

The image formed by the ink of the present invention is highly glossy over the entire image, with a small difference in glossiness among printed portions and unprinted portions, even if the recording medium is a base material having glossiness, such as a polyvinyl chloride sheet. That is, an image formed by the aqueous ink has high quality comparable to that by a solvent ink. According to dot observation, the dots of the resulting image have high smoothness. The reason therefor is not obvious, but it is supposed that a small amount, less than the critical micelle concentration, of the surfactant causes the distribution of a surfactant in an ink droplet after landing to be nonuniform. This leads to a difference in surface tension and thereby Marangoni convection, inhibiting the dots from cohering.

Binder Resin

The ink of the present invention contains a binder resin. In the investigation on dryness of an ink, the degree of evaporation of a solvent defining the dryness of the ink depends on the type of the ink. That is, the degree of reduction in surface tension of an ink after evaporation of a certain amount of the solvent differs depending on the type of the ink. For example, the degree of evaporation of a solvent after the fluidity of an ink droplet is lost should be investigated. In conclusion, it is preferable to prevent the surface tension of an ink from increasing, until the fluidity of an ink droplet is lost by evaporation of the solvent.

The loss of fluidity of an ink droplet is affected by the solid content and the amount of organic solvents in the ink. The pigment concentration is determined from the tone of color, and the amount of organic solvents is determined from the viewpoints of ejecting properties and other performances of the ink. It is therefore preferable to increase the solid content by adding a binder resin to the ink so that the fluidity of an ink droplet is promptly lost.

The binder resin used for such an object may be any resin that is soluble or dispersible in water. The binder resin preferably has the same composition as that of the resin used for increasing the friction resistance of a print image.

Examples of the resin include water-soluble resins and water-dispersible resins such as polyacrylic resins, polystyrene-acrylic resins, polyacrylonitrile-acrylic resins, vinyl acetate-acrylic resins, polyurethane resins, polyamide resins, polyester resins, and polyolefin resins. In particular, acrylic copolymers and water-soluble or water-dispersible polyurethane resins are preferred.

A variety of acrylic copolymer resins, as is well known, can be designed with a high degree of freedom using monomers selected from various monomers that are readily polymerized and can be produced at low cost. From these viewpoints, the acrylic copolymer resins are preferably applied to the present invention. In particular, in order to satisfy many requirements described above, the acrylic copolymer resins having such wide design freedom are preferred.

The polyurethane resins are also preferred, which can be readily formed into aqueous dispersion polymer particles, and the minimum film-forming temperature (MFT) can be readily controlled.

The resin preferably has a glass transition temperature (Tg) of 0° C. or more and 100° C. or less. A Tg of 0° C. or more can provide sufficient friction resistance and can inhibit occurrence of blocking. A Tg of 100° C. or less can provide a desired friction resistance. It is believed that the Tg prevents the image layer after drying from excessively hardening and thus embrittling.

The resin may be added to an ink before dispersion or after dispersion of a pigment. Addition after dispersion of a pigment is preferred.

The amount of the resin in an ink is preferably in the range of 1.0 mass % or more and 15.0 mass % or less, more preferably 3.0 mass % or more and 10.0 mass % or less.

Some or all of the acid components in a resin may be neutralized with a base. The base for neutralization can be an alkali metal-containing base (e.g., NaOH or KOH), an amine (e.g., alkanolamine or alkylamine), or ammonia.

The amount of the base for neutralization varies depending on the amount of an acid monomer. A too small amount of the base is not effective for neutralizing the copolymer resin. A too large amount of the base causes disadvantages, such as a reduction in water resistance, discoloration, and odor of an image. Accordingly, the amount of the base for neutralization is preferably 0.2 mass % or more and 2.0 mass % or less of the total mass of an ink.

Pigment

The pigment serving as a coloring material contained in the ink of the present invention will be described. The coloring material applied to the present invention is a pigment from the viewpoint of image durability.

The pigment may be any of the organic or inorganic pigments known in the art. Examples of the pigment include organic pigments, for example, azo pigments such as azolakes, insoluble azo pigments, condensed azo pigments, and chelate azo pigments; polycyclic pigments such as phthalocyanine pigments, perylene and perynone pigments, anthraquinone pigments, quinacridone pigments, dioxazine pigments, thioindigo pigments, isoindolinone pigments, and quinophthalone pigments; nitro pigments; nitroso pigments; aniline black; and daylight fluorescent pigments; and inorganic pigments, for example, carbon black.

Examples of preferred organic pigment are given below.

Examples of the pigment for magenta, red, or violet include C.I. Pigment Red 2, C.I. Pigment Red 3, C.I. Pigment Red 5, C.I. Pigment Red 6, C.I. Pigment Red 7, C.I. Pigment Red 8, C.I. Pigment Red 12, C.I. Pigment Red 15, C.I. Pigment Red 16, C.I. Pigment Red 17, C.I. Pigment Red 22, C.I. Pigment Red 23, C.I. Pigment Red 41, C.I. Pigment Red 48:1, C.I. Pigment Red 53:1, C.I. Pigment Red 57:1, C.I. Pigment Red 112, C.I. Pigment Red 114, C.I. Pigment Red 122, C.I. Pigment Red 123, C.I. Pigment Red 139, C.I. Pigment Red 144, C.I. Pigment Red 146, C.I. Pigment Red 148, C.I. Pigment Red 149, C.I. Pigment Red 150, C.I. Pigment Red 166, C.I. Pigment Red 170, C.I. Pigment Red 177, C.I. Pigment Red 178, C.I. Pigment Red 220, C.I. Pigment Red 202, C.I. Pigment Red 222, C.I. Pigment Red 238, C.I. Pigment Red 245, C.I. Pigment Red 258, C.I. Pigment Red 282, C.I. Pigment Violet 19, and C.I. Pigment Violet 23.

Examples of the pigment for orange, yellow, or brown include C.I. Pigment Orange 13, C.I. Pigment Orange 16, C.I. Pigment Orange 31, C.I. Pigment Orange 34, C.I. Pigment Orange 43, C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 16, C.I. Pigment Yellow 17, C.I. Pigment Yellow 43, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 109, C.I. Pigment Yellow 110, C.I. Pigment Yellow 120, C.I. Pigment Yellow 128, C.I. Pigment Yellow 129, C.I. Pigment Yellow 138, C.I. Pigment Yellow 139, C.I. Pigment Yellow 147, C.I. Pigment Yellow 150, C.I. Pigment Yellow 151, C.I. Pigment Yellow 153, C.I. Pigment Yellow 154, C.I. Pigment Yellow 155, C.I. Pigment Yellow 175, C.I. Pigment Yellow 180, C.I. Pigment Yellow 181, C.I. Pigment Yellow 185, C.I. Pigment Yellow 194, C.I. Pigment Yellow 199, C.I. Pigment Yellow 213, and C.I. Pigment Brown 22.

Examples of the pigment for green or cyan include C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:5, C.I. Pigment Blue 16, C.I. Pigment Blue 29, C.I. Pigment Blue 60, and C.I. Pigment Green 7.

Examples of the pigment for black include carbon black and C.I. Pigment Black 5 and C.I. Pigment Black 7.

Examples of the pigment for white include titanium oxide and C.I. Pigment White 6. The pigments used in the present invention are not limited to the listed ones.

The pigment undergoes various treatments and is prepared in the form of a pigment dispersion that is stable in an aqueous ink.

The pigment dispersion may be present in any form that can be stably dispersed in an aqueous ink. Examples of the pigment dispersion include a dispersion of a pigment dispersed in a high-molecular dispersing resin, a capsule pigment which is a pigment coated with a water-insoluble resin, and a self-dispersible pigment having a modified surface and dispersible without a dispersing resin.

The high-molecular dispersing resin for the pigment dispersion can be a water-soluble resin. Preferred examples of the water-soluble resin include styrene-acrylic acid-acrylic acid alkylester copolymers, styrene-acrylic acid copolymers, styrene-maleic acid copolymers, styrene-maleic acid-acrylic acid alkylester copolymers, styrene-methacrylic acid copolymers, styrene-methacrylic acid-acrylic acid alkylester copolymers, styrene-maleic acid half ester copolymers, vinylnaphthalene-acrylic acid copolymers, and vinylnaphthalene-maleic acid copolymers.

The pigment may be dispersed in one of the copolymer resins mentioned above.

The pigment can be dispersed with a dispersing means such as a ball mill, a sand mill, an attritor, a roll mill, an agitator mill, a Henschel mixer, a colloid mill, an ultrasonic homogenizer, a pearl mill, a wet jet mill, or a paint shaker.

In order to yield a pigment dispersion having a narrow particle size distribution, the pigment particles are preferably subjected to centrifugation or classification with a filter to remove coarse particles.

The pigment may be coated with a water-insoluble resin and used as a capsule pigment. The water-insoluble resin is insoluble in weakly acidic to weakly basic water and preferably has a solubility of 2.0 mass % or less in an aqueous solution of pH 4 to 10.

Preferred examples of the water-insoluble resin include acrylic resins, styrene-acrylic resins, acrylonitrile-acrylic resins, vinyl acetate resins, vinyl acetate-acrylic resins, vinyl acetate-vinyl chloride resins, polyurethane resins, silicone-acrylic resins, acrylic silicone resins, polyester resins, and epoxy resins.

The dispersing resin or the water-insoluble resin preferably has an average molecular weight of 3000 to 500000, more preferably 7000 to 200000, and preferably has a Tg of about −30° C. to 100° C., more preferably about −10° C. to 80° C.

The mass ratio of a pigment to a resin for dispersing the pigment (pigment/resin (mass ratio)) is preferably in the range of 100/150 to 100/30. In particular, a range of 100/100 to 100/40 can provide high image durability, ejection stability, and ink storage stability.

The average particle diameter of pigment particles coated with a water-insoluble resin is preferably about 80 to 200 nm, from the viewpoints of ink storage stability and chromogenic characteristics.

Various methods are known for coating a pigment with a water-insoluble resin. Preferably, the coating is carried out as follows: a water-insoluble resin is dissolved in an organic solvent such as methyl ethyl ketone; the acidic groups in the resin are partially or completely neutralized with a basic component; a pigment and deionized water are added thereto, followed by dispersion; subsequently, the organic solvent is removed; and water is optionally added thereto. Alternatively, the pigment may be coated with a water-insoluble resin by dispersing the pigment in a polymerizable surfactant and adding a monomer thereto for polymerization.

The self-dispersible pigment may be a commercially available surface-treated pigment. Preferred examples of the self-dispersible pigment include CABO-JET200 and CABO-JET300 (manufactured by Cabot Corp.) and Bonjet CW1 (manufactured by Orient Chemical Industries Co., Ltd.).

The ink of the present invention can optionally contain a preservative, a corrosion inhibitor, an antifoaming agent, a viscosity modifier, a penetrant, a pH adjuster, and an anti-drying agent for nozzle, such as urea, thiourea, or ethylene urea. In particular, from the viewpoints of ejection stability and an improvement in image quality, the ink preferably contains a surfactant. The ink of the present invention is intended to be used in ink jet printing and preferably has a viscosity of 0.5 mPa·s or more and less than 50 mPa·s, which allows ejection of ink droplets with a thermal or piezoelectric ink jet head.

Ink Jet Recording Method

The ink jet recording method of the present invention forms an image on a recording medium using the ink jet ink of the present invention. The recording medium is of a nonabsorbent type, more specifically, a polyvinyl chloride sheet.

In the ink jet recording method of the present invention, the ink jet head for ejecting the ink for forming an image may be an on-demand system or a continuous system. The ink may be ejected by any system such as an electromechanical conversion system (e.g., single cavity type, double cavity type, bender type, piston type, share mode type, or shared wall type) or an electrothermal conversion system (e.g., thermal ink jet type or Bubble Jet (registered trademark) type).

In continuous ejection of an ink for a long time, a large amount of the ink or water may adhere to the nozzle surface of the ink jet head. It is therefore preferable to appropriately clean the nozzle surface with absorbable or nonabsorbable sponge or cloth.

The ink jet recording method of the present invention preferably includes a step of drying the ink by heating. In the ink jet recording method of the present invention, an image is preferably formed through heating the recording medium. The heating of the recording medium considerably increases the drying thickening rate of the ink to provide a high-quality image and also increases image durability.

The surface temperature of a recording medium is preferably adjusted to the range of 45° C. or more and 90° C. or less, more preferably 45° C. or more and 60° C. or less, from the viewpoints of yielding sufficient image quality and sufficient image durability, drying the ejected ink in a short period of time, and stable printing.

Any heating process can be employed. For example, a recording medium may be heated by a contact system with a heater mounted on a medium-transporting system or a platen from below the recording medium or by a noncontact system with a lamp from above or below the recording medium.

Recording Medium

The recording medium that can be applied to the ink jet recording method using the aqueous ink jet ink of the present invention may be a high ink absorbent recording medium such as plain paper, coated paper, paper exclusive for ink jet recording, or fabric or may be a low ink absorbent or nonabsorbent recording medium. The ink jet recording method of the present invention is suitable for printing on nonabsorbent recording media, in particular, on a polyvinyl chloride sheet.

Examples of the nonabsorbent recording medium include recording media having surfaces of resins, specifically, resin plates such as polystyrene plates and acrylonitrile-butadiene-styrene copolymer (ABS resin) plates, plastic films such as polyvinyl chloride films and polyethylene terephthalate (PET) films, which may be laminated on base materials, such as paper. These recording media having surfaces of resins and coated paper have low ink absorbability and low surface energy. In recording on these nonabsorbent recording media with conventional aqueous ink jet inks, the inks are not absorbed and are repelled by the media, resulting in disorder of a recorded image. In addition, due to low dryness and adhesion of the ink, the image has low durability. In contrast, the printing with the ink jet ink of the present invention can form an image excellent in uniformity, pin hole resistance, glossiness, and friction resistance, even on a nonabsorbent recording medium.

Nonabsorbent Recording Medium

The nonabsorbent recording medium that can be applied to the present invention will be described in detail.

Examples of the nonabsorbent recording medium applicable to the present invention include polymer sheets, plates (e.g., soft polyvinyl chloride plates, hard polyvinyl chloride plates, acrylic plates, and polyolefin resin plates), glass, tiles, rubber, and synthetic paper. In particular, polyvinyl chloride recording media are usable.

Specific examples of polyvinyl chloride nonabsorbent recording medium include SOL-371G, SOL-373M, and SOL-4701 (manufactured by VIGteQnos Corp.), Glossy Polyvinyl Chloride (manufactured by System Graphy Co., Ltd.), KSM-VS, KSM-VST, and KSM-VT (manufactured by Kimoto Co., Ltd.), J-CAL-HGX, J-CAL-YHG, and J-CAL-WWWG (manufactured by Kyosho Co., Ltd.), BUS MARK V400 F vinyl and LITEcal V-600F vinyl (manufactured by Flexcon Co., Ltd.), FR2 (manufactured by Hanwha Chemical Co.) LLBAU13713 and LLSP20133 (manufactured by Sakurai Co., Ltd.), P-370B and P-400M (manufactured by Kanbo Pras Corp.), S02P, S12P, S13P, S14P, S22P, 524P, S34P, and S27P (manufactured by Grafityp Co., Ltd.), P-223RW, P-224RW, P-249ZW, and P-284ZC (manufactured by Lintec Corp.), LKG-19, LPA-70, LPE-248, LPM-45, LTG-11, and LTG-21 (manufactured by Shinseisha Co., Ltd.), MPI3023 (manufactured by Toyo Corp.), Napoleon Gloss Glossy Polyvinyl Chloride (manufactured by Niki Inc.), JV-610 and Y-114 (manufactured by IKC Co., Ltd.), NIJ-CAPVC and NIJ-SPVCGT (manufactured by Nitie Corp.), 3101/H12/P4, 3104/H12/P4, 3104/H12/P4S, 9800/H12/P4, 3100/H12/R2, 3101/H12/R2, 3104/H12/R2, 1445/H14/P3, and 1438/One Way Vision (manufactured by Intercoat Co.), JT5129PM, JT5728P, JT5822P, JT5829P, JT5829R, JT5829PM, JT5829RM, and JT5929PM (manufactured by Mactac AG), MPI1005, MPI1900, MPI2000, MPI2001, MPI2002, MPI3000, MPI3021, MPI3500, and MPI3501 (manufactured by Avery Corp.), AM-101G and AM-501G (manufactured by Gin-Ichi Corp.), FR2 (manufactured by Hanwha Japan Co., Ltd.), AY-15P, AY-60P, AY-80P, DBSP137GGH, and DBSP137GGL (manufactured by Insight Co.), SJT-V200F and SJT-V400E-1 (manufactured by Hiraoka & Co., Ltd.), SPS-98, SPSM-98, SPSH-98, SVGL-137, SVGS-137, MD3-200, MD3-301M, MD5-100, MD5-101M, and MD5-105 (manufactured by Metamark UK Ltd.), 640M, 641G, 641M, 3105M, 31055G, 3162G, 3164G, 3164M, 3164XG, 3164XM, 3165G, 3165SG, 3165M, 3169M, 34515G, 3551G, 3551M, 3631, 3641M, 3651G, 3651M, 3651SG, 3951G, and 3641M (manufactured by Orafol Europe GmbH), SVTL-HQ130 (manufactured by Lami Corporation Inc.), SP300 GWF and SPCLEARAD vinyl (manufactured by Catalina Co.), RM-SJR (manufactured by Ryoyoshoji Co., Ltd.), Hi Lucky and New Lucky PVC (manufactured by LG Corp.), SIY-110, SIY-310, and SIY-320 (manufactured by Sekisui Chemical Co., Ltd.), PRINT MI Frontlit and PRINT XL Light weight banner (manufactured by Endutex S.A.), RIJET 100, RIJET 145, and RIJET165 (manufactured by Ritrama S.p.A.), NM-SG and NM-SM (manufactured by Nichiei Kakoh Co., Ltd.), LTO3GS (manufactured by Rukio Co., Ltd.), Easy Print 80 and Performance Print 80 (manufactured by JetGraph Co., Ltd.), DSE 550, DSB 550, DSE 800G, DSE 802/137, V250WG, V300WG, and V350WG (manufactured by Hexis AG), and Digital White 6005PE and 6010PE (manufactured by Multifix N. V.).

EXAMPLES

The present invention will be described with reference to Examples in more detail, but should not be limited thereto. Note that "part(s)" and "%" in Examples mean "part(s) by mass" and "mass %", respectively, unless specifically defined otherwise.

Example 1

Synthesis of Binder Resin

Synthesis of Binder Resin P-1

Into a flask equipped with a drop funnel, a nitrogen gas inlet tube, a reflux condensing tube, a thermometer, and a stirrer was placed 50 parts of methyl ethyl ketone, which was then heated to 75° C. with nitrogen bubbling. A mixture of a monomer composition (9.0 parts of methacrylic acid, 78 parts of methyl methacrylate, 6.5 parts of n-butyl acrylate, and 6.5 parts of 2-ethylhexyl acrylate), 50 parts of methyl ethyl ketone, and 0.5 parts of an initiator (AIBN: 2,2'-azobisisobutyronitrile) was dropwise added to the flask over 3 hr from the drop funnel. The mixture was then heated under reflux for a further 6 hr. After cooling, the methyl ethyl ketone was distilled off by heating under reduced pressure to yield a copolymer resin.

Separately, a solution of dimethylaminoethanol was prepared by dissolving dimethylaminoethanol in 450 parts of deionized water in an amount of 1.05 times molar equivalent to (meth)acrylic acids in the monomer composite. The copolymer was dissolved in the solution.

The solid content was adjusted to 20% with deionized water to yield a 20 mass % aqueous solution of binder resin P-1 having a hydrophobic monomer as a polymerization component.

Synthesis of Binder Resin P-2

Into a flask equipped with a drop funnel, a reflux tube, a nitrogen gas inlet tube, a thermometer, and a stirrer was placed 186 parts of 2-propanol, which was then heated under reflux with nitrogen bubbling. A monomer solution prepared by dissolving 0.5 parts of an initiator (AIBN) in a mixture of 76 parts of methyl methacrylate, 13 parts of 2-ethylhexyl acrylate, and 11 parts of methacrylic acid was dropwise added to the flask over 2 hr from the drop funnel. After addition, the mixture was heated under reflux for a further 5 hr. Subsequently, 2-propanol was distilled off by heating under reduced pressure to yield a copolymer resin as a water-soluble resin P-2. To 20 parts of the water-soluble resin P-2 were added 67.8 parts of deionized water and 12.2 parts of N,N-dimethylaminoethanol as a base for neutralization. The mixture was heated at 70° C. with stirring to dissolve the resin to yield an aqueous solution containing 20% water-soluble resin P-2 (solid resin content). The amount of N,N-dimethylaminoethanol was chemically equivalent to 1.05 times the amount of acid groups of binder resin P-2.

Preparation of Pigment Dispersion

Preparation of Cyan Pigment Dispersion

Twenty parts of Flowlen TG-750W (solid content: 40%, manufactured by Evonik Degussa Corp.) serving as a pigment dispersing agent and 3 parts of triethylene glycol monobutyl ether were added to 62 parts of deionized water. To this solution, 15 parts of C.I. Pigment Blue 15:3 was added, followed by premixing. The premix was subjected to dispersion treatment with a sand grinder loaded with 50 vol % of 0.5 mm zirconium beads to yield a cyan pigment dispersion having a pigment solid content of 15%.

Preparation of Ink

Preparation of Cyan Inks C1 to C20

The cyan pigment dispersion, binder resins, organic solvents A, B, and C, and surfactants were mixed by stirring in accordance with formulations shown in Table 2. Each mixture was passed through a filter having a pore size of 0.8 μm to prepare cyan inks C1 to C20. Note that each amount expressed in mass % in Table 2 is based on the solid content and that the total amount of each ink was adjusted to 100 mass % with added deionized water as the balance.

In cyan inks C1 to C14 among the cyan inks shown in Table 2, the concentrations of all surfactants excluding BYK DYN-WET800 (DW800), i.e., the concentrations of Olfine E1010 in cyan inks C1 and C13, Novec N4432 in cyan inks C2 and C12, Megafac F-410 in cyan inks C3, C9, and C10, BYK-333 in cyan ink C4, BYK-381 in cyan ink C5, Megafac F-447 in cyan ink C6, Surfynol 465 in cyan inks C7 and C11, and BYK-375 in cyan inks C8 and C14, are lower than their respective critical micelle concentrations.

TABLE 2

| Cyan ink No. | Cyan pigment dispersion | Fixing resin No. | Fixing resin Amount | Organic solvent A A1 | Organic solvent A A2 | Organic solvent A A3 | Organic solvent B B1 | Organic solvent B B2 | Organic solvent C C1 | Organic solvent C C2 | Organic solvent C C3 | *1 (%) | *2 |
|---|---|---|---|---|---|---|---|---|---|---|---|---|---|
| C1 | 4.0 | P-1 | 5.0 | — | — | — | 20.0 | 5.0 | 8.0 | — | — | 76 | 33 |
| C2 | 4.0 | P-2 | 5.0 | — | — | — | 7.0 | — | 5.0 | — | 10.0 | 32 | 22 |
| C3 | 4.0 | P-1 | 5.0 | — | — | — | — | 10.0 | 10.0 | — | 10.0 | 33 | 30 |
| C4 | 4.0 | P-2 | 5.0 | — | — | — | 10.0 | 10.0 | 5.0 | — | — | 80 | 25 |
| C5 | 4.0 | P-1 | 5.0 | — | 5.0 | — | 15.0 | — | 10.0 | 5.0 | 10.0 | 44 | 45 |
| C6 | 4.0 | P-1 | 5.0 | — | 5.0 | — | 5.0 | — | — | — | 10.0 | 50 | 20 |
| C7 | 4.0 | P-1 | 5.0 | 10.0 | 5.0 | — | 10.0 | — | — | 10.0 | — | 71 | 35 |
| C8 | 4.0 | P-2 | 5.0 | — | 5.0 | 3.0 | 3.0 | — | — | — | 5.0 | 69 | 16 |
| C9 | 4.0 | P-1 | 5.0 | 2.0 | — | — | 5.0 | — | — | 5.0 | 10.0 | 32 | 22 |
| C10 | 4.0 | P-2 | 5.0 | — | — | 5.0 | — | — | 5.0 | — | — | 50 | 10 |
| C11 | 4.0 | P-1 | 5.0 | — | — | — | — | — | — | 10.0 | 5.0 | 0 | 15 |
| C12 | 4.0 | P-1 | 5.0 | — | — | — | 3.0 | — | — | 10.0 | — | 23 | 13 |
| C13 | 4.0 | P-1 | 5.0 | — | — | — | — | 10.0 | — | — | — | 100 | 10 |
| C14 | 4.0 | P-1 | 5.0 | — | 30.0 | — | — | — | — | — | — | 97 | 10 |
| C15 | 4.0 | P-1 | 5.0 | — | — | — | 10.0 | — | — | 20.0 | — | 33 | 30 |
| C16 | 4.0 | P-1 | 5.0 | — | — | 10.0 | 10.0 | — | 10.0 | — | 5.0 | 57 | 35 |
| C17 | 4.0 | P-1 | 5.0 | 5.0 | — | — | 10.0 | — | 5.0 | — | — | 75 | 20 |
| C18 | 4.0 | P-1 | 5.0 | — | — | — | 20.0 | — | — | — | — | 100 | 20 |
| C19 | 4.0 | P-1 | 5.0 | — | — | — | — | — | — | 20.0 | — | 0 | 20 |
| C20 | 4.0 | P-1 | 5.0 | 3.0 | — | — | — | — | — | 10.0 | — | 23 | 13 |

| Cyan ink No. | Surfactant 1 Type | Surfactant 1 Amount | Surfactant 2 Type | Surfactant 2 Amount | Note |
|---|---|---|---|---|---|
| C1 | DW800 | 1.000 | E1010 | 0.050 | Example |
| C2 | N4432 | 0.008 | — | — | Example |
| C3 | DW800 | 1.000 | MF410 | 0.010 | Example |
| C4 | DW800 | 1.000 | BYK333 | 0.020 | Example |
| C5 | BYK381 | 0.010 | — | — | Example |
| C6 | DW800 | 1.000 | MF447 | 0.020 | Example |
| C7 | DW800 | 1.000 | SF465 | 0.030 | Example |
| C8 | BYK375 | 0.005 | — | — | Example |
| C9 | DW800 | 1.000 | MF410 | 0.030 | Example |
| C10 | DW800 | 1.000 | MF410 | 0.050 | Example |
| C11 | DW800 | 1.000 | SF465 | 0.008 | Comp. Ex. |
| C12 | DW800 | 1.000 | N4432 | 0.010 | Comp. Ex. |
| C13 | DW800 | 1.000 | E1010 | 0.005 | Comp. Ex. |
| C14 | DW800 | 1.000 | BYK375 | 0.010 | Comp. Ex. |
| C15 | DW800 | 1.000 | MF410 | 1.000 | Comp. Ex. |
| C16 | BYK375 | 1.000 | — | — | Comp. Ex. |
| C17 | DW800 | 1.000 | BYK381 | 1.000 | Comp. Ex. |
| C18 | DW800 | 1.000 | E1010 | 1.000 | Comp. Ex. |
| C19 | DW800 | 1.000 | SF465 | 1.000 | Comp. Ex. |
| C20 | SF465 | 1.000 | — | — | Comp. Ex. |

Organic solvent A: ΣSP = 8.0 to 15.0 MPa$^{1/2}$

Organic solvent B: ΣSP = 15.1 to 18.0 MPa$^{1/2}$

Organic solvent C: ΣSP = 18.1 MPa$^{1/2}$ or more

*1: [(organic solvent A) + (organic solvent B)]/[(organic solvent A) + (organic solvent B) + (organic solvent C)] × 100 (%)

*2: (organic solvent A) + (organic solvent B) + (organic solvent C) (mass %)

Note 1: The total amount was adjusted with deionized water to 100 mass %.

Note 2: The units of all numerical values (addition amounts) excluding those in column *1 are mass %.

Details of the surfactants shown by abbreviations in Table 2, column "Surfactant", are as follows:

DW800: BYK DYNWET800 (manufactured by BYK Chemie GmbH, surfactant having a polyoxyethylene alkyl ether group), N4432: Novec 4432 (manufactured by 3M Company, surfactant having a perfluorobutanesulfonic acid group), MF410: Megafac F-410 (manufactured by DIC Corporation, surfactant of carboxylic acid having a perfluoroalkyl group), MF477: Megafac F-477 (manufactured by DIC Corporation, fluorine group, hydrophilic group, and hydrophobic group-containing oligomer), BYK333: BYK-333 (manufactured by BYK Chemie GmbH, poly-ether modified polydimethylsiloxane), BYK375: BYK-375 (manufactured by BYK Chemie GmbH, polyetherester-modified hydroxy group-containing polydimethylsiloxane), BYK381: BYK-381 (manufactured by BYK Chemie GmbH, acrylic polymer), E1010: Olfine E1010 (manufactured by Nissin Chemical Industry Co., Ltd., ethylene oxide adduct of acetylenediol), and SF465: Surfynol 465 (manufactured by Air Products and Chemicals, Inc., acetylenediol surfactant).

Details of the organic solvents shown by abbreviations in Table 2 are shown in Table 3.

TABLE 3

| Organic solvent classification | Abbreviation | Name of organic solvent | ΣSP (MPa$^{1/2}$) |
|---|---|---|---|
| Organic solvent A | A1 | Dipropylene glycol dimethyl ether | 8.9 |
| | A2 | 3-Butoxy-N,N-dimethylpropionamide | 13.8 |
| | A3 | Dipropylene glycol monopropyl ether | 14.3 |
| Organic solvent B | B1 | Dipropylene glycol monomethyl ether | 16.2 |
| | B2 | 3-Methoxy-N,N-dimethylpropionamide | 17.6 |
| Organic solvent C | C1 | 2-Pyrrolidone | 18.6 |
| | C2 | N-Methylpyrrolidone | 20.0 |
| | C3 | 1,2-Hexanediol | 23.6 |

In Tables 2 and 3, an organic solvent having a sum (σP+H) of the hydrogen bonding term and the polarity term of the solubility parameter in the range of 15.1 MPa$^{1/2}$ or more and 18.0 MPa$^{1/2}$ or less is classified into the organic solvent B; an organic solvent having a sum (σP+H) of the hydrogen bonding term and the polarity term of the solubility parameter in the range of 8.0 MPa$^{1/2}$ or more and 15.0 MPa$^{1/2}$ or less into the organic solvent A; and an organic solvent having a sum (σP+H) of the hydrogen bonding term and the polarity term of the solubility parameter in the range of 18.1 MPa$^{1/2}$ or more into the organic solvent C.

Measurement of Characteristic Values of Ink

Viscosity

The viscosity of each ink was measured at an ink temperature of 25° C. with a vibration-type viscometer (Viscomaite VM-1L, manufactured by CBC Materials Co., Ltd.). All of cyan inks C1 to C20 had a viscosity in the range of 5 to 15 mPa·s.

Measurement of Surface Tension

The surface tension of each ink was measured by a platinum plate method at an ink temperature of 25° C. with a surface tension balance CBVP-Z manufactured by Kyowa Interface Science Co., Ltd. All of cyan inks C1 to C20 had a surface tension in the range of 20 to 30 mN/m.

Measurement of Surface Tension Associated with Change in Evaporation Rate of Ink Changes in surface tension of each ink due to evaporation of the solvents were measured as follows.

A certain amount of each ink was placed in a beaker and was stirred at 50° C. for a predetermined time. Subsequently, the change in mass of the ink was measured, and the surface tension at each evaporation rate range was measured. The behaviors of the surface tension are roughly classified into four types as shown in FIG. 6.

Among cyan inks C1 to C20, cyan inks C1 to C14 showed a profile (type 1 (*a*) in FIG. 6) in which the surface tension decreases by 1.0 mN/m or more once in the evaporation rate X range of 0<X(%)≤20, whereas cyan inks C15 to C20 showed a profile (type 2 (*b*) in FIG. 6) in which the surface tension increases with evaporation rate without a range where the surface tension decreases.

Formation of Image

A drop-on-demand ink jet printer is provided that includes four piezoelectric heads arranged side by side, each piezoelectric head having a nozzle diameter of 28 μm, a drive frequency of 10 kHz, a nozzle number of 512, a minimum droplet volume of 14 μL, and a nozzle density of 360 dpi (dpi refers to the number of dots per 2.54 cm). Each cyan ink was loaded on the ink jet heads.

The ink jet printer was equipped with a contact-type heater in such a manner that the reverse side of a recording medium (opposite side of the surface facing the head) can be spontaneously heated. The ink jet printer has a blank ink shooting position and a blade wiping type maintenance unit at the head housing position. The head was cleaned at an adequate frequency.

Solid images of 10 cm×10 cm were formed at a printing resolution of 720 dpi×720 dpi on a soft vinyl chloride sheet MD5 (manufactured by Metamark UK Ltd.) as a recording medium for a solvent ink jet printer. The solid images were formed of 10% duty to 100% duty with an increment of 10% duty. The printing was performed at 8-pass printing in one direction.

Printing was performed while the surface temperature of the recording medium was maintained at 50° C. by warming the recording medium from the reverse side with the heater. The surface temperature of the recording medium was measured with a contactless thermometer (model IT-530N, manufactured by Horiba, Ltd.). The recording medium was placed on a hot plate at 60° C. for drying immediately after the printing.

Evaluation of Recorded Image

Evaluation of Uneven Density Resistance

The solid images printed at 100% duty were visually examined for uniformity of the printed image surface (uneven density defects of ink-applied portion). The uneven density resistance was evaluated based on the following criteria.

Excellent: the solid image is uniform and does not have unevenness at all,

Good: the solid image hardly has uneven density defects, but very weak uneven density defects are observed at some positions of the boundary between the solid image and unprinted portion, Moderate: the solid image has uneven density defects and is nonuniform, and Poor: repelling and uneven density defects are visually observed all over the image which has a large number of uneven defects in the order of mm and an image quality that is not practically applicable.

Inks evaluated as Excellent or Good in these evaluation criteria were determined to be practically preferable.

Evaluation of Pin Hole Resistance

The solid images printed at 100% duty were visually examined for degrees of filling of the printed image surface. The pin hole resistance was evaluated based on the following criteria.

Excellent: the entire solid image is uniformly filled with ink and does not have any pin hole, Good: the solid image has slightly unprinted portions (pin hole), but is uniform as a whole, Moderate: the solid image has a linear hole, and streaks of the hole running in the scanning direction are recognized even when observed at a distance of 50 cm or more, and Poor: large hole due to portions unfilled with ink are visually observed as white streaks, and the image quality is not practically applicable.

Inks evaluated as Excellent or Good in these evaluation criteria were determined to be practically preferable.

Evaluation of Glossiness

The solid images printed at 100% duty were visually examined for glossiness of the printed image surface. The glossiness was evaluated based on the following criteria.
Good: the image has glossiness,
Poor: the image does not have glossiness or has white turbidness as if having a film on the image surface, and
-: repellency is too hard to evaluate glossiness.

Inks evaluated as Good in these evaluation criteria were determined to be practically preferable.

Evaluation of Friction Resistance

The surfaces of solid images printed at 100% duty were rubbed with a dry cotton (canaquim No. 3) cloth under a load of 200 g. The friction resistance was evaluated based on the following criteria.
Excellent: no change is recognized in the solid image,
Good: slight color staining of the cloth is observed, but no change is recognized in the solid image, and
Poor: white linear scratches or partial detachment of the image is recognized.

Inks evaluated as Excellent or Good in these evaluation criteria were determined to be practically preferable.

Table 4 shows the evaluation results.

for example, uneven density and pin holes are decreased to further improve image quality. In inks C1 to C5, C7, C9, and C10 containing organic solvents having ability of dissolving polyvinyl chloride, i.e., 2-pyrrolidone (2-PDN) and N-methyl-pyrrolidone (NMP), the friction resistance is notably enhanced.

Example 2

Cyan inks C21 to C40 were prepared as in preparation of inks in Example 1 except that Joncryl 537J (manufactured by BASF Japan, Inc., styrene-acrylic resin emulsion) was used instead of binder resin P-1 and that JDX: Joncryl JDX-6500 (manufactured by BASF Japan, Inc., acrylic resin) was used instead of binder resin P-2, in cyan inks C1 to C20, and the resulting inks were evaluated.

Cyan inks C21 to C30 according to the present invention satisfied requirements (a) to (c) and formed highly glossy images without uneven density and pin holes. In contrast, cyan inks C31 to C40 in Comparative Examples did not satisfy any one of requirements (a) to (c) and did not form high-quality images.

TABLE 4

| Cyan ink No. | Requirements in Claim 1 Satisfied (○), Unsatisfied (X) | | | Evaluation results | | | | Note |
|---|---|---|---|---|---|---|---|---|
| | Requirement (a) | Requirement (b) | Requirement (c) | Uneven density resistance | Print void resistance | Glossiness | Friction resistance | |
| C1  | ○ | ○ | ○ | Good      | Good      | Good | Excellent | Example |
| C2  | ○ | ○ | ○ | Good      | Good      | Good | Excellent | Example |
| C3  | ○ | ○ | ○ | Good      | Good      | Good | Excellent | Example |
| C4  | ○ | ○ | ○ | Good      | Good      | Good | Excellent | Example |
| C5  | ○ | ○ | ○ | Good      | Good      | Good | Excellent | Example |
| C6  | ○ | ○ | ○ | Excellent | Excellent | Good | Good      | Example |
| C7  | ○ | ○ | ○ | Good      | Excellent | Good | Excellent | Example |
| C8  | ○ | ○ | ○ | Good      | Excellent | Good | Good      | Example |
| C9  | ○ | ○ | ○ | Excellent | Excellent | Good | Excellent | Example |
| C10 | ○ | ○ | ○ | Excellent | Excellent | Good | Excellent | Example |
| C11 | ○ | X | ○ | Moderate  | Poor      | Poor | Poor | Comp. Ex. |
| C12 | ○ | X | ○ | Moderate  | Moderate  | Poor | Poor | Comp. Ex. |
| C13 | ○ | X | ○ | Moderate  | Poor      | Poor | Poor | Comp. Ex. |
| C14 | ○ | X | ○ | Moderate  | Moderate  | Poor | Poor | Comp. Ex. |
| C15 | X | ○ | X | Poor      | Moderate  | Poor | Poor | Comp. Ex. |
| C16 | X | ○ | X | Poor      | Poor      | Poor | Poor | Comp. Ex. |
| C17 | X | ○ | X | Poor      | Moderate  | Poor | Poor | Comp. Ex. |
| C18 | X | ○ | X | Poor      | Moderate  | Poor | Poor | Comp. Ex. |
| C19 | X | X | X | Poor      | Poor      | —    | Poor | Comp. Ex. |
| C20 | X | ○ | X | Poor      | Moderate  | Poor | Poor | Comp. Ex. |

As shown in Table 4, inks C1 to C10 (the present invention) satisfying requirements (a) to (c) form highly glossy images not having uneven density and pin holes, whereas inks C11 to C20 not satisfying any one of requirements (a) to (c) form images having defects and are therefore impractical.

In particular, the inks C11 to C14 in Comparative Examples, which satisfy requirements (a) and (c), but do not satisfy requirement (b), do not form good images. Inks C15 to C18 in Comparative Examples, which satisfy requirement (b), but do not satisfy requirements (a) and (c), also do not form good images.

Among inks C1 to C10 according to the present invention, in inks C5 to C10 containing organic solvent A having a sum ΣSP of the hydrogen bonding term and the polarity term of the solubility parameter defined in requirement (b) of the organic solvent in the range of 8 MPa$^{1/2}$ or more and 15 MPa$^{1/2}$ or less, Example 3

Preparation of Pigment Dispersion

Preparation of Yellow Pigment Dispersion

To 60 parts of deionized water were added 10 parts of EFKA-4585 (solid content: 50%, manufactured by BASF Japan, Inc.) serving as a pigment dispersing agent and 10 parts of 1,2-hexanediol. To this solution, 15 parts of Levascreen Yellow G01 (manufactured by Lanxess Deutschland GmbH) was added, followed by premixing. The premix was subjected to dispersion treatment with a sand grinder loaded with 50 vol % of 0.5 mm zirconium beads to yield a yellow pigment dispersion having a pigment solid content of 15%.

Preparation of Magenta Pigment Dispersion

A magenta pigment dispersion was prepared as in preparation of the cyan pigment dispersion in Example 1 except that Pigment Red 122 (manufactured by Dainichiseika Color & Chemicals Mfg. Co., Ltd., CFR-321) was used as a magenta pigment instead of C.I. Pigment Blue 15:3 as the cyan pigment.

Preparation of Black Pigment Dispersion

To 60 parts of deionized water were added 10 parts of EFKA-4585 (solid content: 50%, manufactured by BASF Japan, Inc.) serving as a pigment dispersing agent and 10 parts of 1,2-hexanediol. To this solution, 15 parts of Raven 1000 (manufactured by Colombian Chemical Company) was added, followed by premixing. The premix was subjected to dispersion treatment with a sand grinder loaded with 50 vol % of 0.5 mm zirconium beads to yield a black pigment dispersion having a pigment solid content of 15%.

Preparation of Ink

Preparation of Yellow inks Y1 to Y20, Magenta Inks M1 to M20, and Black Inks K1 to K20

Yellow inks Y1 to Y20, magenta inks M1 to M20, and black inks K1 to K20 were prepared as in preparation of cyan inks C1 to C20 in Example 1 except that the yellow pigment dispersion, the magenta pigment dispersion, or the black pigment dispersion was used instead of the cyan pigment dispersion.

Image Formation and Evaluation

Image formation and image evaluation were performed as in Example 1. Like Example 1, the yellow inks Y1 to Y10, the magenta inks M1 to M10, and the black ink K1 to K10 (the present invention) formed images having excellent glossiness, without causing uneven density and pin holes. The other inks, however, caused image defects and were impractical.

Example 4

Preparation of Ink Sets

Preparation of Ink Set 1

An ink set 1 composed of cyan ink C1 prepared in Example 1 and yellow ink Y1, magenta ink M1, and black ink K1 prepared in Example 3 was prepared.

Preparation of Ink Sets 2 to 13

Figure 5:
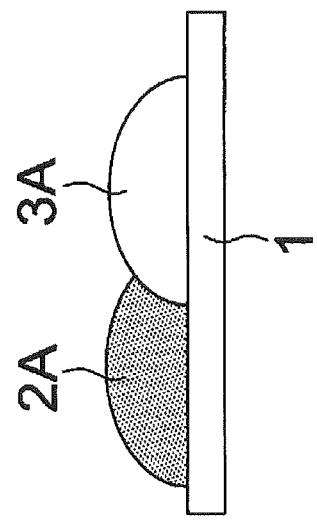
FIG. 5 is a schematic diagram illustrating an exemplary pattern of forming an image with an ink of the present invention by landing of a second ink droplet after discharge of a first ink droplet.
Figure 5:
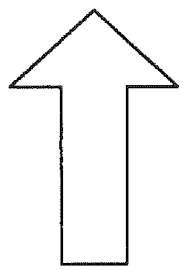
Figure 5:
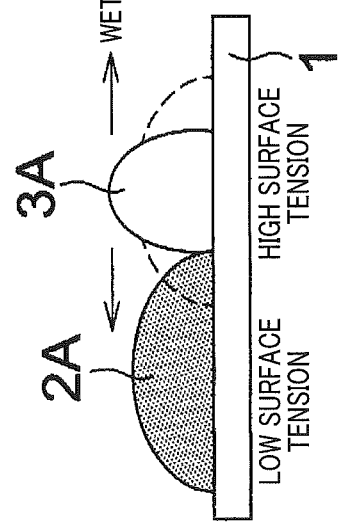

Ink sets 2 to 13 were prepared as in preparation of ink set 1 in combinations shown in FIG. 5 using cyan inks C2 to C10, yellow inks Y2 to Y10, magenta inks M2 to M10, and black inks K2 to K10.

Formation of Image

A drop-on-demand ink jet printer is provided that includes four piezoelectric heads arranged side by side, each piezoelectric head having a nozzle diameter of 28 μm, a drive frequency of 10 kHz, a nozzle number of 512, a minimum droplet volume of 14 pL, and a nozzle density of 360 dpi (dpi refers to the number of dots per 2.54 cm). Each ink set was loaded on the ink jet heads.

The ink jet printer was equipped with a contact-type heater in such a manner that the reverse side of a recording medium (opposite side of the surface facing the head) can be spontaneously heated. The ink jet printer has a blank ink shooting position and a blade wiping type maintenance unit at the head housing position. The head was cleaned at an adequate frequency.

Solid images of 10 cm×10 cm were formed at a printing resolution of 720 dpi×720 dpi on each recording medium. The solid images were formed of 10% duty to 200% duty with an increment of 10% duty. The printing was performed at 8-pass printing in one direction.

Printing was performed while the surface temperature of the recording medium was maintained at 50° C. by warming the recording medium from the reverse side with the heater. The surface temperature of the recording medium was measured with a contactless thermometer (model IT-530N, manufactured by Horiba, Ltd.). The recording medium was placed on a hot plate at 60° C. for drying immediately after the printing.

The recording media used are shown below. Images formed on the recording media were evaluated as in Example 1.

Recording Medium

1) Soft vinyl chloride sheet: MD5 (manufactured by Metamark UK Ltd.), evaluated items=uneven density resistance, pin holes resistance, glossiness, and friction resistance;
2) PET: polyethylene terephthalate sheet, White PET (manufactured by Maruu Co., Ltd.), evaluated items=uneven density resistance, pin hole resistance, and glossiness;
3) Mirror coated paper: Mirror Coat Satin Kanefuji (manufactured by Oji Paper Co., Ltd.), evaluated items=uneven density resistance and pin hole resistance;
4) Blue back: Billboard paper 1372 (manufactured by Kimoto Co., Ltd.), evaluated items=uneven density resistance and pin hole resistance;
5) Cotton: 40 Broad (manufactured by Nextant Corp.), evaluated items=uneven density resistance and pin hole resistance; and
6) Cloth: 20 Viyella (manufactured by Nextant Corp.), evaluated items=uneven density resistance and pin hole resistance.

Table 5 shows the evaluation results.

TABLE 5

| Ink set No. | Each color ink composition | | | | Soft vinyl chloride sheet (MD5) | | | | PET | | | Mirror coat | | Blue coat | | Cotton | | Cloth | |
|---|---|---|---|---|---|---|---|---|---|---|---|---|---|---|---|---|---|---|---|
| | | | | | Eva. 1 | Eva. 2 | Eva. 3 | Eva. 4 | Eva. 1 | Eva. 2 | Eva. 3 | Eva. 1 | Eva. 2 | Eva. 1 | Eva. 2 | Eva. 1 | Eva. 2 | Eva. 1 | Eva. 2 |
| 1 | Y1 | M1 | C1 | K1 | Good | Good | Good | Excel | Good | Good | Good | Good | Good | Good | Good | Good | Good | Good | Good |
| 2 | Y2 | M2 | C2 | K2 | Good | Good | Good | Excel | Good | Good | Good | Good | Good | Good | Good | Good | Good | Good | Good |
| 3 | Y3 | M3 | C3 | K3 | Good | Excel | Good | Excel | Good | Good | Good | Good | Good | Good | Good | Good | Good | Good | Good |
| 4 | Y4 | M4 | C4 | K4 | Good | Excel | Good | Excel | Good | Good | Good | Good | Good | Good | Good | Good | Good | Good | Good |
| 5 | Y5 | M5 | C5 | K5 | Excel | Excel | Good | Excel | Good | Good | Good | Excel | Excel | Excel | Excel | Excel | Excel | Excel | Excel |
| 6 | Y6 | M6 | C6 | K6 | Excel | Excel | Good | Good | Excel | Excel | Good | Excel | Excel | Excel | Excel | Excel | Excel | Excel | Excel |
| 7 | Y7 | M7 | C7 | K7 | Excel | Excel | Good | Excel | Good | Good | Good | Good | Good | Excel | Excel | Excel | Excel | Excel | Excel |
| 8 | Y8 | M8 | C8 | K8 | Excel | Excel | Good | Good | Excel | Excel | Good | Excel | Excel | Excel | Excel | Excel | Excel | Excel | Excel |
| 9 | Y9 | M9 | C9 | K9 | Excel | Excel | Good | Excel | Good | Good | Good | Excel | Excel | Excel | Excel | Excel | Excel | Excel | Excel |
| 10 | Y10 | M10 | C10 | K10 | Good | Good | Good | Excel | Good | Good | Good | Good | Good | Good | Good | Good | Good | Good | Good |
| 11 | Y8 | M6 | C7 | K7 | Excel | Excel | Good | Excel | Excel | Excel | Good | Excel | Excel | Excel | Excel | Good | Good | Excel | Excel |

TABLE 5-continued

| Ink set No. | Each color ink composition | | | | Soft vinyl chloride sheet (MD5) | | | | PET | | | Mirror coat | | Blue coat | | Cotton | | Cloth | |
|---|---|---|---|---|---|---|---|---|---|---|---|---|---|---|---|---|---|---|---|
| | | | | | Eva. 1 | Eva. 2 | Eva. 3 | Eva. 4 | Eva. 1 | Eva. 2 | Eva. 3 | Eva. 1 | Eva. 2 | Eva. 1 | Eva. 2 | Eva. 1 | Eva. 2 | Eva. 1 | Eva. 2 |
| 12 | Y6 | M6 | C8 | K6 | Excel | Excel | Good | Excel | Good | Good | Good | Excel | Excel | Excel | Excel | Good | Good | Good | Good |
| 13 | Y7 | M8 | C7 | K8 | Excel | Excel | Good | Excel | Excel | Excel | Good | Good | Good | Good | Good | Good | Good | Excel | Excel |

Eva. 1: uneven density resistance
Eva. 2: pin hole resistance
Eva. 3: glossiness
Eva. 4: friction resistance
Excel: Excellent As shown in Table 5, the inks according to the present invention have advantageous effects not only in monochrome images but also in multicolor images of two or more colors. The inks also can form satisfactory high-quality images on various recording media, as well as on nonabsorbent recording media such as polyvinyl chloride sheets.

| Reference Signs List | |
|---|---|
| 1 | nonabsorbent recording medium |
| 2, 2A | first ink droplet |
| 3, 3A | second ink droplet |
| 4 | pin hole |
| 5 | uneven density |
| a | type 1 |
| b | type 2 |
| c | type 3 |
| d | type 4 |

The invention claimed is:

1. An ink jet ink comprising a pigment, a binder resin, water, an organic solvent, and one or more surfactants and satisfying the following requirements (a), (b), and (c):

Requirement (a): the ink jet ink has a surface tension in a region defined by Expression (2) when an evaporation rate X defined by Expression (1) is in a range of 0<X(%)≤20, evaporation rate $X(\%) = \{[(\text{initial mass of ink jet ink}) - (\text{mass of ink jet ink after evaporation})]/(\text{initial mass of ink jet ink})\} \times 100$,  Expression (1)

$\gamma_0 - \gamma_x \geq 1.0$ (mN/m),  Expression (2)

(wherein, $\gamma_0$ represents a surface tension (mN/m) of the ink jet ink before evaporation; and $\gamma_x$ represents a surface tension (mN/m) of the ink jet ink at an evaporation rate X % and 0<X(%)≤20);

Requirement (b): the ink jet ink contains two or more organic solvents; and a content of an organic solvent of which a sum ΣSP of the hydrogen bonding term and the polarity term of the solubility parameter is 8 MPa$^{1/2}$ or more and 18 MPa$^{1/2}$ or less is 30 mass % or more and less than 95 mass % of a total amount of the organic solvents in the ink jet ink; and Requirement (c): a content of at least one of the surfactants is less than a critical micelle concentration of the surfactant.

2. The ink jet ink according to claim 1, wherein the sum ΣSP of the hydrogen bonding term and the polarity term of the solubility parameter defined in requirement (b) of the organic solvent is 8 MPa$^{1/2}$ or more and 15 MPa$^{1/2}$ or less.

3. The ink jet ink according to claim 1, wherein the total content of the organic solvents is 5.0 mass % or more and 40 mass % or less of a total mass of the ink jet ink.

4. The ink jet ink according to claim 1, wherein a solubility of polyvinyl chloride in at least one of the organic solvents is 1.0 mass % or more.

5. The ink jet ink according to claim 1, further comprising a β-alkoxypropionamide.

6. An ink jet recording method comprising ejecting the ink jet ink according to claim 1 on a recording medium to form thereon an image.

7. The ink jet recording method according to claim 6, further comprising drying by heating the ink.

8. The ink jet recording method according to claim 6, wherein the recording medium is a nonabsorbent recording medium.

* * * * *